United States Patent
Tsushima

(10) Patent No.: US 9,581,516 B2
(45) Date of Patent: Feb. 28, 2017

(54) DIFFERENTIAL PRESSURE SENSOR AND DIFFERENTIAL PRESSURE SENSOR MANUFACTURING METHOD

(71) Applicant: Azbil Corporation, Tokyo (JP)

(72) Inventor: Ayumi Tsushima, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 129 days.

(21) Appl. No.: 14/713,170

(22) Filed: May 15, 2015

(65) Prior Publication Data

US 2015/0330854 A1    Nov. 19, 2015

(30) Foreign Application Priority Data

May 16, 2014   (JP) ................................ 2014-102510

(51) Int. Cl.
| | | |
|---|---|---|
| G01L 13/02 | (2006.01) | |
| G01L 19/04 | (2006.01) | |
| G01L 19/14 | (2006.01) | |
| G01L 9/00 | (2006.01) | |

(52) U.S. Cl.
CPC ............ G01L 13/026 (2013.01); G01L 19/04 (2013.01); G01L 19/142 (2013.01); *G01L 2009/0069* (2013.01); *Y10T 29/49119* (2015.01)

(58) Field of Classification Search
None
See application file for complete search history.

(56) References Cited

U.S. PATENT DOCUMENTS

| 7,360,431 | B2 | 4/2008 | Yoneda et al. | |
|---|---|---|---|---|
| 2006/0272422 | A1 | 12/2006 | Yoneda et al. | |
| 2013/0233085 | A1* | 9/2013 | Mizoguti | G01L 13/025 73/716 |
| 2014/0144243 | A1* | 5/2014 | Tanaka | G01L 13/025 73/716 |

FOREIGN PATENT DOCUMENTS

JP    2005-069736    3/2005

* cited by examiner

*Primary Examiner* — Andre Allen
(74) *Attorney, Agent, or Firm* — Troutman Sanders LLP

(57) ABSTRACT

A differential pressure sensor has a sensor chip that is, between a first inner wall surface and a second inner wall surface of a sensor chamber, joined by a first adhesive agent layer between one face of the sensor chip and the first inner wall surface of the sensor chamber and joined through a second adhesive agent layer between other face of the sensor chip and the second inner wall surface of the sensor chamber. The first adhesive agent layer is an adhesive agent layer that has a Young's modulus that is smaller than the Young's modulus of a material that structures a sensor diaphragm. The second adhesive agent layer is an adhesive agent layer that has a Young's modulus that is smaller than the Young's modulus of the material that structures the sensor diaphragm and larger than the Young's modulus of the first adhesive agent layer.

8 Claims, 24 Drawing Sheets

Cross-Section along Section A-A

DIFFERENTIAL PRESSURE SENSOR AND DIFFERENTIAL PRESSURE SENSOR MANUFACTURING METHOD

CROSS REFERENCE TO RELATED APPLICATION

This application claims priority under 35 U.S.C. §119 to Japanese Patent Application No. 2014-102510, filed on May 16, 2014, the entire content of which being hereby incorporated herein by reference.

FIELD OF TECHNOLOGY

The present disclosure relates to a differential pressure sensor that uses a sensor diaphragm for outputting a signal in accordance with a differential pressure that is borne on one face and on another face thereof, and to a method for manufacturing a differential pressure sensor.

BACKGROUND

Conventionally, differential pressure sensors that use sensor diaphragms for outputting signals in accordance with differences between pressures borne on one face and borne on the other face have been used as differential pressure sensors for industrial use. These differential pressure sensors are structured so as to guide liquid pressures, which will act on high-pressure-side and low-pressure-side pressure bearing diaphragms, to one side face and the other side face of a sensor diaphragm, through a pressure transmitting medium (a filled liquid) such as silicone oil, so as to detect the deformation of the sensor diaphragm as, for example, a change in a resistance value of a strain resistance gauge, to convert this change in the resistance value into an electric signal, so as to be outputted to the outside.

This type of differential pressure sensor is used when measuring, for example, a liquid surface height through detecting a pressure difference between two locations, upper and lower, within a sealed tank for storing a fluid that is to be measured, such as a high-temperature reaction tower in an oil refining plant.

FIG. 24 illustrates the critical structures in a conventional differential pressure sensor. See, for example, Japanese Unexamined Patent Application Publication No. 2005-69736. In this figure: 1-1 is a sensor diaphragm; 1-2 and 1-3 are first and second stoppers that are bonded with the sensor diaphragm 1-1 interposed therebetween; and 1-4 and 1-5 are first and second glass pedestals to which the stoppers 1-2 and 1-3 are bonded, where a sensor chip 1 is structured with the stopper 1-2 and the glass pedestal 1-4 as a first retaining member, and the stopper 1-3 and the glass pedestal 1-5 as a second retaining member. The sensor diaphragm 1-1 is made from silicon, and a strain resistance gauge is formed on a surface of the diaphragm, which is formed in a thin plate shape. The stoppers 1-2 and 1-3 are also structured from silicon.

In this sensor chip 1, a recessed portion 1-2a is formed in the stopper 1-2, where the peripheral edge portion 1-2b of the recessed portion 1-2a faces one face 1-1a of the sensor diaphragm 1-1, and the stopper 1-2 is bonded to the one face 1-1a the sensor diaphragm 1-1. A recessed portion 1-3a is formed in the stopper 1-3, where the peripheral edge portion 1-3b of the recessed portion 1-3a faces the other face 1-1b of the sensor diaphragm 1-1, and the stopper 1-3 is bonded to the other face 1-1b the sensor diaphragm 1-1.

The recessed portions 1-2a and 1-3a of the stoppers 1-2 and 1-3 have surfaces (aspherical surfaces) that are curved along the dislocation of the sensor diaphragm 1-1, where pressure introducing holes (pressure guiding holes) 1-2c and 1-3c are formed at the apex portions thereof. Pressure introducing holes (pressure guiding holes) 1-4a and 1-5a are formed in the glass pedestals 1-4 and 1-5 as well, at positions corresponding to those of the pressure guiding holes 1-2c and 1-3c of the stopper members 1-2 and 1-3.

This sensor chip 1 is contained in a sensor chamber 3 that is formed as an interior space in a sensor housing 2 (a package body made from metal). In this example, the top face of the sensor chip 1 (the top face of a glass pedestal 1-4) is in an open state, that is, the bottom face of the sensor chip 1 (the bottom face of a glass pedestal 1-5) is coated with an epoxy adhesive agent and bonded to an inner wall surface 3b of the bottom face side of the sensor chamber 3 without the top face of the sensor chip 1 being bonded to the inner wall surface 3a of the top face side of the sensor chamber 3. In the sensor housing 2, a pressure introducing path (a pressure guiding path) 2b is formed in a position corresponding to a pressure guiding hole 1-5a of the glass pedestal 1-5.

In this differential pressure sensor 100, the fluid pressure Pa passes through the pressure guiding hole 1-4a of the glass pedestal 1-4 and the pressure guiding hole 1-2c of the stopper 1-2, through a pressure transmitting medium such as silicon oil, to be applied to the one face 1-1a of the sensor diaphragm 1-1. Moreover, the fluid pressure Pb passes through the pressure introducing path 2b of the sensor housing 2 and the pressure guiding hole 1-5a of the glass pedestal 1-5 and the pressure guiding hole 1-3c of the stopper 1-3, through a pressure transmitting medium such as silicon oil, to be applied to the other face 1-1b of the sensor diaphragm 1-1.

In this case, when there is a displacement of the sensor diaphragm 1-1 when an excessively large pressure is applied to the other face 1-1a of the sensor diaphragm 1-1, the entirety of the dislocated face is supported and stopped by the curved surface of the recessed portion 1-3a of the stopper 1-3. Moreover, then when there is a displacement of the sensor diaphragm 1-1 when an excessively large pressure is applied to the other face 1-1b of the sensor diaphragm 1-1, the entirety of the dislocated face is supported and stopped by the curved surface of the recessed portion 1-2a of the stopper 1-2.

This effectively prevents accidental rupturing of the sensor diaphragm 1-1 due to the application of an excessively large pressure, through preventing excessive dislocation when an excessively large pressure is applied to the sensor diaphragm 1-1, by preventing a concentration of stresses on the peripheral edge portion of the sensor diaphragm 1-1, thus enabling an increase in the excessively large pressure guard operating pressure (withstand pressure).

However, the differential pressure sensor 100 with such a structure has a weakness in that when one face 1-1a side of the sensor diaphragm 1-1 is the high-pressure side for bearing the pressure Pa and the other face 1-1b side of the sensor diaphragm 1-1 is the low-pressure side for bearing the pressure Pb, it will break easily when a pressure (a reverse pressure) that is higher than that of the high-pressure side is applied to the low-pressure side.

That is, in this differential pressure sensor 100, when a pressure that is higher than the low-pressure side is applied to the high-pressure side, the withstand pressure is high because a state will be produced where in the junction portion 4-1 is pressed by the pressure Pa, which is a high-pressure that would act so as to separate the junction portion 4-1 between the stopper 1-2 and the sensor diaphragm 1-1 of the sensor chip 1, but when a pressure (a reverse pressure) that is higher than that of the high-pressure side is applied to the low-pressure side, a state will be produced wherein the junction portion 4-2 is pressed by only the pressure Pa, which is a pressure that is lower than the pressure Pb, which is a high-pressure that acts of so as to separate the junction portion 4-2 between the stopper 1-3 and the sensor diaphragm 1-1 of the sensor chip 1, and thus tends to cause damage.

Note that while normally one would think that in use the one face 1-1$a$ side of the sensor diaphragm 1-1 that bears the pressure Pa will be set as the high-pressure side and the other face 1-1$b$ side of the sensor diaphragm 1-1 that bears in the pressure Pb will be set as the low-pressure side, in a differential pressure sensor 100 with this structure there will be cases wherein the high/low relationship between the pressure Pa and the pressure Pb may become reversed, or, without the high/low relationship of the pressure Pa and the pressure Pb becoming reversed, the one face 1-1$a$ side of the sensor diaphragm 1-1 may mistakenly be selected as the low-pressure side and the other face 1-1$b$ side set as the high-pressure side, so merely establishing the high-pressure side and the low-pressure side cannot eliminate the weakness that the junction portions 4-1 and 4-2 in the sensor chip 1 can be separated easily.

The present invention was created in order to solve such issues, and an aspect thereof is to provide a differential pressure sensor, and a differential pressure sensor manufacturing method, able to achieve simultaneously an improvement in pressure durability performance and mitigation of thermal stress in the sensor chip.

SUMMARY

The present invention, to achieve such an aspect, is a differential pressure sensor including a sensor chip having: a sensor diaphragm that outputs a signal in accordance with a difference in pressures borne by one face and another face; a first retaining member, bonded facing a peripheral edge portion of the one face of the sensor diaphragm, and having a first pressure guiding hole for guiding a first fluid pressure to the one face of the sensor diaphragm; and a second retaining member, bonded facing a peripheral edge portion of the other face of the sensor diaphragm, and having a second pressure guiding hole for guiding a second fluid pressure to the other face of the sensor diaphragm. The differential pressure sensor also includes a sensor housing having: a sensor chamber that contains the sensor chip; a first pressure guiding duct that guides the first fluid pressure to a first inner wall surface of the sensor chamber; and a second pressure guiding duct that guides the second fluid pressure to a second inner wall surface of the sensor chamber. The sensor chip, between a first inner wall surface and a second inner wall surface of the sensor chamber, is joined by a first adhesive agent between one face of the sensor chip and the first inner wall surface of the sensor chamber and joined through a second adhesive agent layer between another face of the sensor chip and the second inner wall surface of the sensor chamber. The first adhesive agent layer is an adhesive agent layer that has a Young's modulus that is smaller than the Young's modulus of the material that structures the sensor diaphragm; and the second adhesive agent layer is an adhesive agent layer that has a Young's modulus that is smaller than the Young's modulus of the material that structures the sensor diaphragm and larger than the Young's modulus of the first adhesive agent layer.

In the present invention, the sensor chip is joined between a first inner wall surface and a second inner wall surface of the sensor chamber through first and second adhesive agent layers. In this case, in the sensor chip the one face is joined through the first adhesive agent layer to the first inner wall surface of the sensor chamber and the other face is joined through the second adhesive agent layer to the second wall surface of the sensor chamber, so the sensor chip is held between the first inner wall surface and the second inner wall surface of the sensor chamber so that regardless of the high/low pressure relationship between the first fluid pressure and the second fluid pressure, and even if a large differential pressure is produced, the sensor chip will be pushed against the first inner wall surface through the first adhesive agent layer and against the second inner wall surface through the second adhesive agent layer. This prevents separation of the sensor diaphragm and the retaining member, making it possible to avoid separation of the junction portions in the sensor chip regardless of the high/low pressure relationship between the first fluid pressure and the second fluid pressure.

Moreover, in the present invention the first adhesive agent layer is an adhesive agent layer having a Young's modulus that is less than the Young's modulus of the material that structures the sensor diaphragm (for example a Young's modulus of no more than $\frac{1}{1000}$ of the Young's modulus of the material that structures the sensor diaphragm), and the second adhesive agent layer is an adhesive agent layer having a Young's modulus that is less than the Young's modulus of the material that structures the sensor diaphragm and greater than the Young's modulus of the first adhesive agent layer (for example, a Young's modulus of no less than 100 times the Young's modulus of the first adhesive agent layer). Because of this, when heat from the outside is conducted from the first inner wall surface or the second inner wall surface to the sensor chip, the first adhesive agent layer acts as a layer for mitigating the thermal stress in the tensile (or compressive) direction, mitigating the thermal stress in the tensile (or compressive) direction in the junction surface of the sensor chip it is caused by differences in the coefficient of thermal expansion. As a result, this prevents separation of the junction portions of the sensor chip even when there is a change in the peripheral temperature, rather than just when there are high pressures.

Given the present invention, the sensor chip is joined between a first inner wall surface and a second inner wall surface of the sensor chamber through first and second adhesive agent layers the first adhesive agent layer between the one surface of the sensor chip and the first inner face of the sensor chamber is an adhesive agent layer that has a Young's modulus that is smaller than the Young's modulus of the material that structures the sensor diaphragm; and the second adhesive agent layer between the other surface of the sensor chip and the second inner face of the sensor chamber is an adhesive agent layer that has a Young's modulus that is smaller than the Young's modulus of the material that structures the sensor diaphragm and greater than the Young's modulus of the first adhesive agent layer thus mitigating the stress caused by the pressure that is applied to the junction portions of the sensor chip, and mitigating the thermal stress, when under high pressure and when there is a change in the ambient temperature, thus preventing separation of the junction portions of the sensor chip, making it possible to achieve simultaneously an increase in the pressure withstand performance and a mitigation of the thermal stress in the sensor chip.

BRIEF DESCRIPTIONS OF THE DRAWINGS

DETAILED DESCRIPTION

Examples according to the present disclosure will be explained below in detail, based on the drawings.

Example

Figure 1:
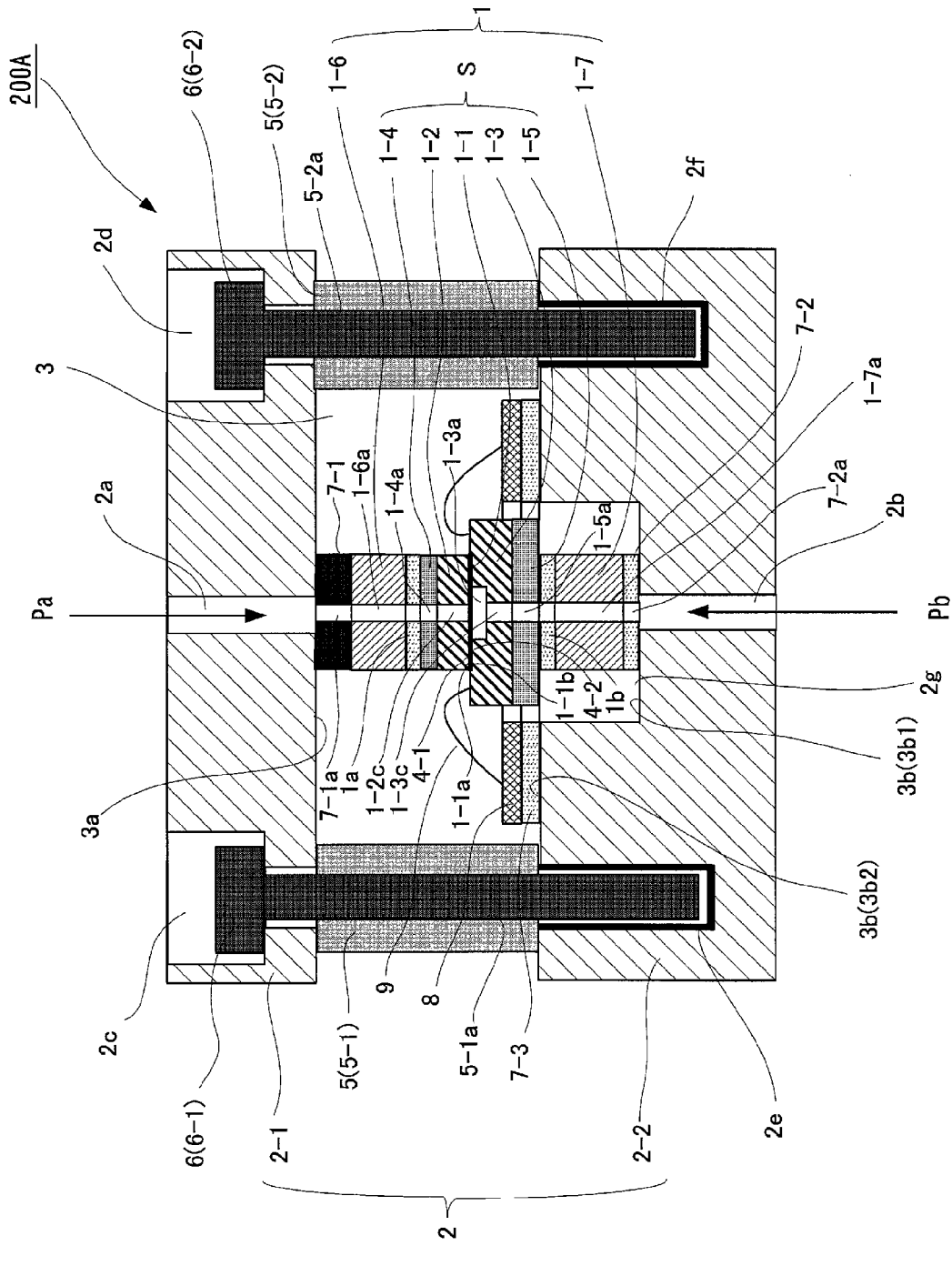
FIG. 1 is a cross-sectional diagram illustrating the critical structures of Example of a differential pressure sensor according to the present disclosure.
Figure 24:
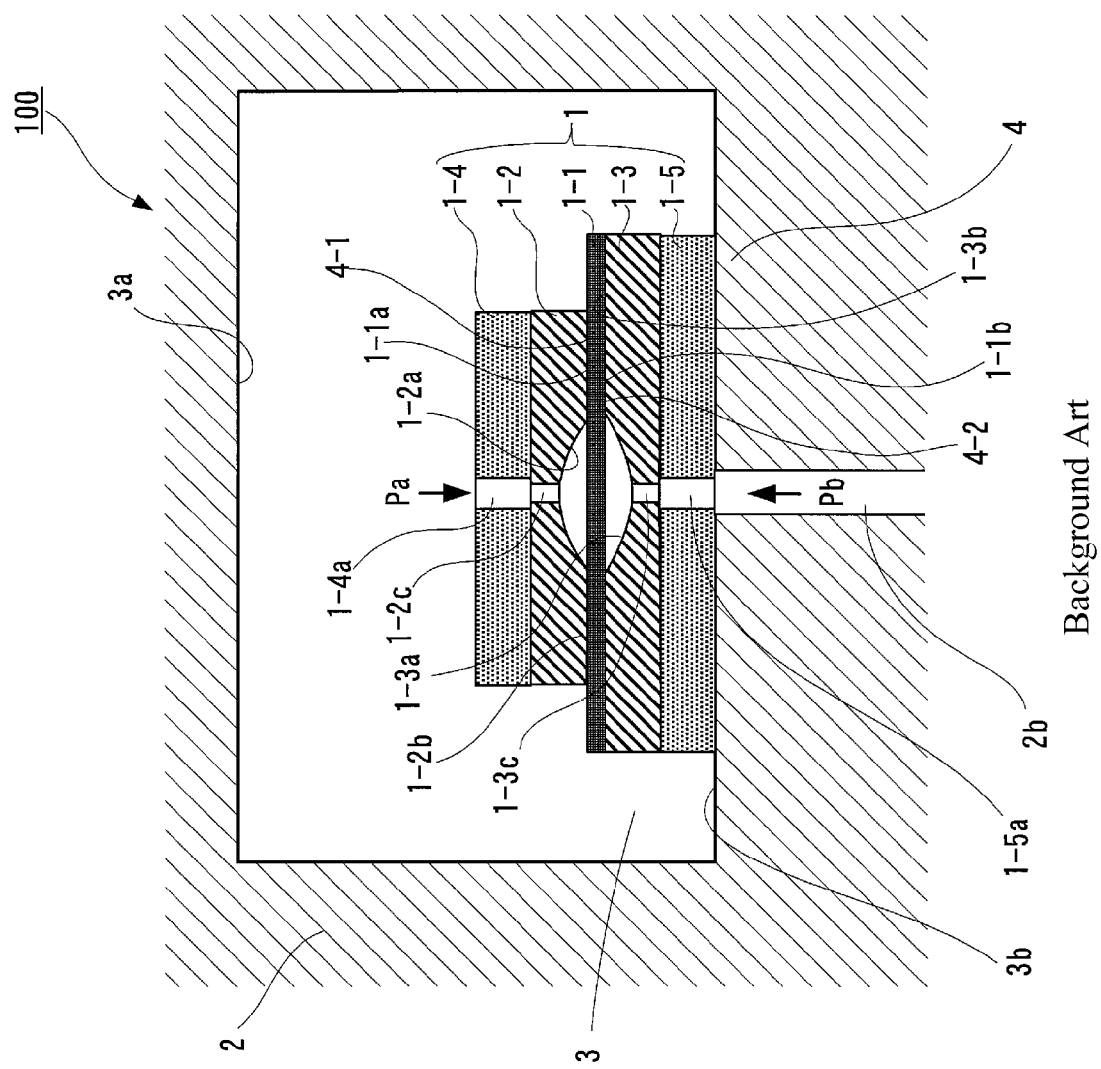
FIG. 24 is a cross-sectional diagram illustrating the critical structures of a conventional differential pressure sensor.

FIG. 1 is a cross-sectional diagram illustrating the critical structures of Example of a differential pressure sensor according to the present disclosure. In this figure, codes that are the same as those in FIG. 24 indicate identical or equivalent structural elements as the structural elements explained in reference to FIG. 24, and explanations thereof are omitted.

In the differential pressure sensor 200A in this Example, the sensor housing 2 has a structure that is divided in two, with a first housing 2-1 and a second housing 2-2, where the first housing 2-1 and the second housing 2-2 are combined together, with two spacers 5 (5-1 and 5-2) interposed therebetween.

Figure 2:
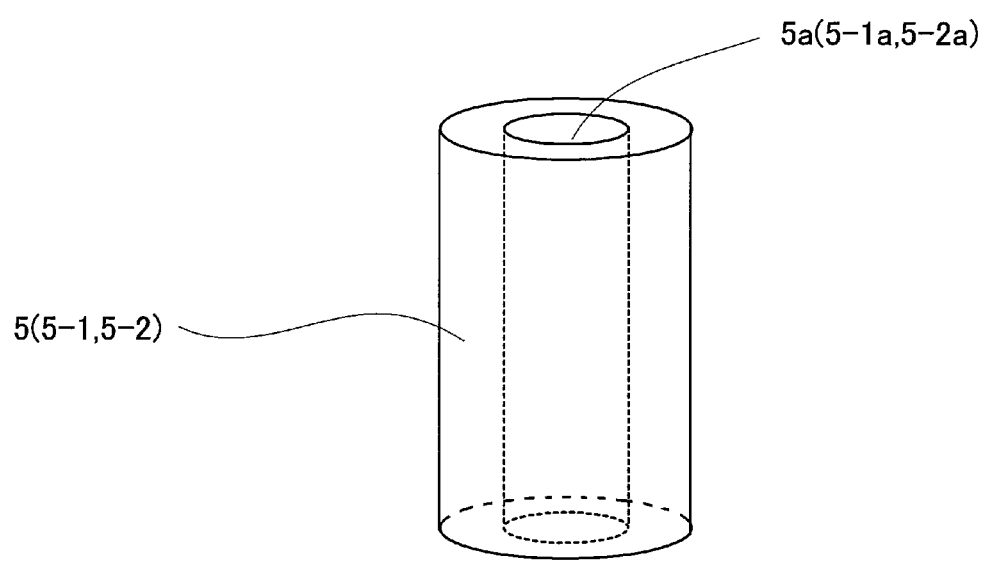
FIG. 2 is an external perspective diagram of a spacer used in this differential pressure sensor.

An external perspective diagram of the spacers 5 is shown in FIG. 2. The spacers 5 are cylindrical and provided with hollow portions 5a in the center portions thereof, and, like the sensor housing 2, are made out of metal (made out of stainless steel).

In the present example, stepped holes 2c and 2d are formed in the first housing 2-1, and screw holes 2e and 2f are formed in the second housing 2-2, where bolts 6-1 and 6-2 are passed through the hollow portions 5-1a and 5-2a of the spacers 5-1 and 5-2 from the stepped holes 2c and 2d of the first housing 2-1, and the tip ends of these bolts 6-1 and 6-2 that pass through the hollow portions 5-1a and 5-2a of the spacers 5-1 and 5-2 are screwed into the screw holes 2e and 2f of the second housing 2-2 to securely fasten the first housing 2-1 and the second housing 2-2 together.

Moreover, in this differential pressure sensor 200A, the space between the first housing 2-1 and the second housing 2-2, that is, the space between the first housing 2-1 and the second housing 2-2 wherein the periphery is open, with these two spacers 5-1 and 5-2 as columns, is defined as a sensor chamber 3, where the sensor chip 1 is provided in this sensor chamber 3.

In the present example, in the sensor chip 1, the assembly of the sensor diaphragm 1-1, the stoppers 1-2 and 1-3, and the glass pedestals 1-4 and 1-5 is the sensor portion S, and is structured with a pedestal 1-6 and a pedestal 1-7 joined to the top face and the bottom face of this sensor portion S.

In the present example, the pedestals 1-6 and 1-7 are made from Kovar (an alloy wherein nickel and cobalt are mixed into iron), where the pedestals 1-6 and 1-7 are adhered, through an epoxy adhesive agent, to the top face (the top face of the glass pedestal 1-4) and the bottom face (the bottom face of the glass pedestal 1-5) of the sensor portion S. 1$a$ and 1$b$ are epoxy adhesive agent layers between the glass pedestals 1-4 and 1-5 and the pedestals 1-6 and 1-7 that are made of Kovar. In the below, the pedestals 1-6 and 1-7 that are made from Kovar will be termed "Kovar pedestals."

In this sensor chip 1, the stopper 1-2, the glass pedestal 1-4, and the Kovar pedestal 1-6 correspond to the first retaining member in the present disclosure, where the stopper 1-3, the glass pedestal 1-5, and the Kovar pedestal 1-7 correspond to the second retaining member. Pressure introducing holes (pressure guiding holes) 1-6$a$ and 1-7$a$ are formed also in the Kovar pedestals 1-6 and 1-7, at positions corresponding to the pressure guiding holes 1-4$a$ and 1-5$a$ of the glass pedestals 1-4 and 1-5.

Figure 23:
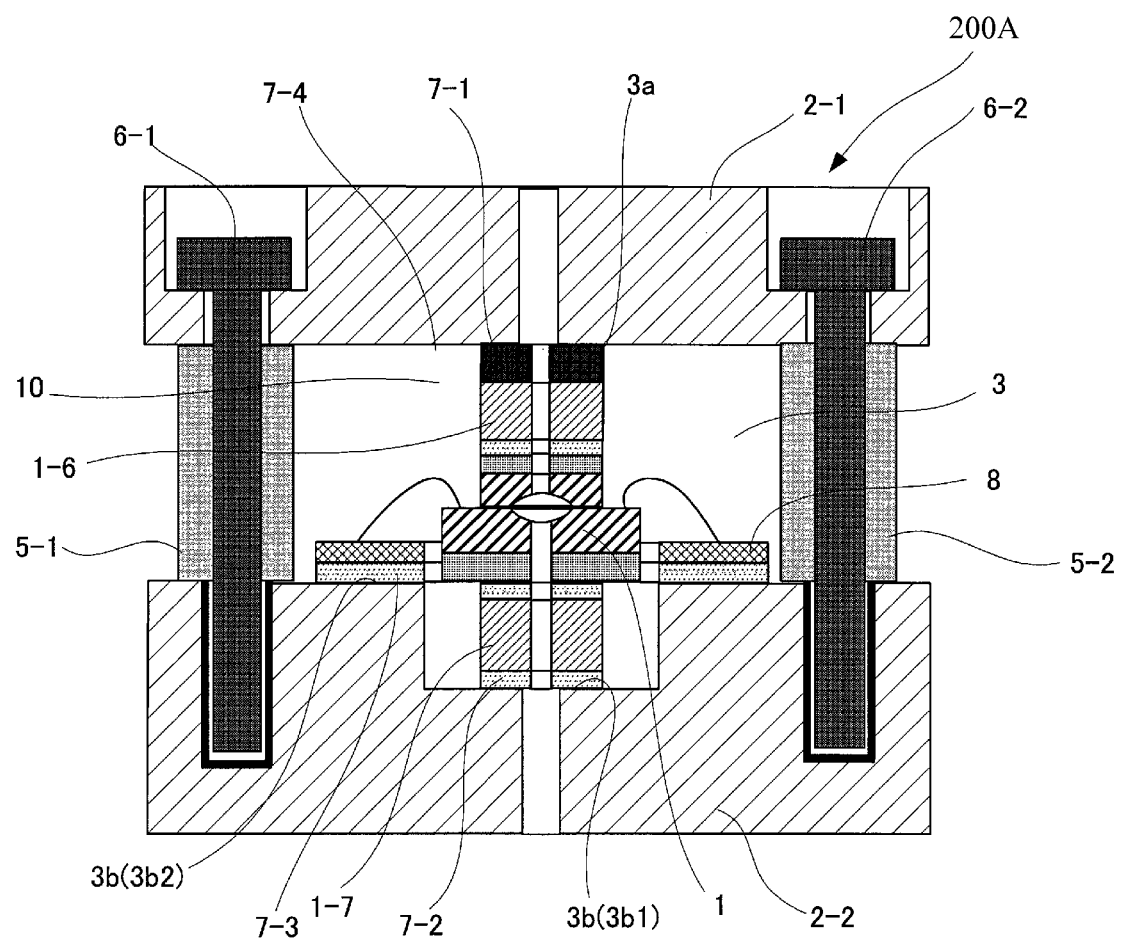
FIG. 23 is a diagram illustrating an example wherein recessed portions with aspherical surfaces are provided in stoppers above and below the sensor chip in the differential pressure sensor according to the Example.

Note that while in the present example the one face 1-1$a$ side of the sensor diaphragm 1-1 is defined as the high-pressure side and the other face 1-1$b$ side is defined as the low-pressure side, and a recessed portion 1-3$a$ is provided on only the stopper 1-3 side, a similar recessed portion may also, of course, be provided on the stopper 1-2 side. Moreover, preferably the shape of the recessed portion is a surface (an aspherical surface) that is curved along the dislocation of the sensor diaphragm 1-1. An example wherein recessed portions 1-2$a$ and 1-3$a$ with aspherical surfaces are provided in the stoppers 1-2 and 1-3 in a differential pressure sensor 200A is illustrated in FIG. 23.

In this differential pressure sensor 200A, the first housing 2-1 and the second housing 2-2 face each other with the sensor chamber 3 interposed therebetween, where the inner wall surface of the first housing 2-1 that is opposing is defined as the inner wall surface 3$a$ on the top face side of the sensor chamber 3, and the inner wall surface of the second housing 2-2 is defined as the inner wall surface 3$b$ on the bottom face side of the sensor chamber 3. In the below, the inner wall surface 3$a$ on the top face side of the sensor chamber 3 will be termed the inner wall surface of the first housing 2-1, and the inner wall surface 3$b$ on the bottom face side of the sensor chamber 3 will be termed the inner wall surface of the second housing 2-2.

In the present example, the inner wall surface 3$a$ of the first housing 2-1 is a flat surface, where a large-diameter stepped hole 2$g$ is provided in the center portion of the inner wall surface 3$b$ of the second housing 2-2. In the sensor chip 1, one face (the top face of the Kovar pedestal 1-6) is joined through the first adhesive agent layer 7-1 to the inner wall surface 3$a$ of the first housing 2-1, and the other surface (the bottom face of the Kovar pedestal 1-7) is joined through the second adhesive agent layer 7-2 to the bottom face 3$b1$ of these larger diameter stepped hole 2$g$ of the inner wall surface 3$b$ of the second housing 2-2.

In the present invention, the first adhesive agent layer 7-1 is an adhesive agent layer having a Young's modulus of no more than $1/1000$ of the Young's modulus of the material that structures the sensor diaphragm 1-1. Moreover, the second adhesive agent layer 7-2 is an adhesive agent layer having a Young's modulus of no less than 100 times the Young's modulus of the first adhesive layer 7-1. In this example, the material that structures the sensor diaphragm 1-1 is silicon, where the first adhesive agent layer 7-1 is a layer of a cured fluorine adhesive agent, and the second adhesive agent layer 7-2 is a layer of a cured epoxy adhesive agent.

The Young's modulus of silicon is 190 GPa, the Young's modulus of fluorine resin, when cured, is 10 MPa, so the Young's modulus of fluorine resin, when cured, is about $1/19{,}000$ the Young's modulus of silicon. Note that a fluorine (or silicon) adhesive agent has a coefficient of linear expansion that is several times that of an epoxy adhesive agent, and has the physical property of having a Young's modulus that is between $1/100$ and $1/1000$ as much when cured. In other words, the epoxy adhesive agent has a coefficient of linear expansion that is a few tenths that of the fluorine (or silicon) adhesive agent, and, when cured, it has the physical property of having a Young's modulus that is between 100 and 1,000 times as large. In the below, the first adhesive agent layer 7-1 will be termed a "soft adhesive layer," and the second adhesive layer 7-2 will be termed an "epoxy adhesive layer."

In the first housing 2-1, a pressure introducing path (a pressure guiding path) 2$a$ is formed in a position that faces the pressure guiding hole 1-6$a$ of the Kovar pedestal 1-6, and, in the second housing 2-2, a pressure introducing path (pressure guiding path) 2$b$ is formed in a position facing the pressure guiding hole 1-7$a$ of the Kovar pedestal 1-7. Moreover, a connecting hole 7-1$a$, for connecting the pressure guiding hole 1-6$a$ and the pressure guiding path 2$a$ is formed in the soft adhesive layer 7-1, and a connecting hole 7-2$a$ for connecting the pressure guiding hole 1-7$a$ and the pressure guiding path 2$b$ is formed in the epoxy adhesive layer 7-2.

The pressure guiding path 2$a$, the connecting hole 7-1$a$, and the pressure guiding holes 1-6$a$, 1-4$a$, and 1-2$c$ connect the fluid pressure Pa on the high-pressure side to the one face 1-1$a$ of the sensor diaphragm 1-1, where the pressure transmitting medium, such as silicon oil, is sealed in this connecting passage. Moreover, the pressure guiding path 2$b$, the connecting hole 7-2$a$, and the pressure guiding holes 1-7$a$, 1-5$a$, and 1-3$c$ connect the fluid pressure Pb on the low-pressure side to the other face 1-1$b$ of the sensor diaphragm 1-1, where the pressure transmitting medium, such as silicon oil, is sealed in this connecting passage.

Note that 8 is a printed substrate, and is adhered through an epoxy adhesive agent to the peripheral edge face 3$b2$ of the stepped hole 2$g$ that is formed in the center portion of the inner wall surface 3$b$ of the second housing 2-2. 7-3 is an epoxy adhesive layer that is formed between the printed substrate 8 and the inner wall surface 3$b$ (the peripheral edge face 3$b2$ of the stepped hole 2$g$) of the second housing 2-2. Moreover, an electrical connection is achieved between the sensor portion S of the sensor chip 1 and the printed substrate 8 through a wire bonding 9.

In this differential pressure sensor 200A, the fluid pressure Pa on the high-pressure side passes through the pressure guiding path 2$a$ of the first housing 2-1, the connecting hole 7-1$a$ of the soft adhesive layer 7-1, the pressure guiding hole 1-6$a$ of the Kovar pedestal 1-6, the pressure guiding hole 1-4$a$ of the glass pedestal 1-4, and the pressure guiding hole 1-2$c$ of the stopper 1-2, to the applied to the one face 1-1$a$ of the sensor diaphragm 1-1. Moreover, the fluid pressure Pb on the low-pressure side passes through the pressure guiding 2$b$ of the second housing 2-2, the connecting hole 7-2$a$ of the epoxy adhesive layer 7-2, the pressure guiding hole 1-7$a$ of the Kovar pedestal 1-7, the pressure guiding hole 1-5$a$ of the glass pedestal 1-5 and the pressure guiding hole 1-3$c$ of the stopper 1-3, to be applied to the other face 1-1$b$ of the sensor diaphragm 1-1.

In this differential pressure sensor 200A, the sensor chip 1 is joined between the inner wall surface 3$a$ on the top face side of the sensor chamber 3 and the inner wall surface 3b on the bottom face side through the soft adhesive layer 7-1 and the epoxy adhesive layer 7-2. That is, the one face of the sensor chip 1 (the top face of the Kovar pedestal 1-6) is joined to the inner wall surface 3a of the first housing 2-1 through the soft adhesive layer 7-1, and the other face of the sensor chip 1 (the bottom face of the Kovar pedestal 1-7) is joined to the inner wall surface 3b (the bottom face 3b1 of the stepped hole 2g) of the second housing 2-2 through the epoxy adhesive layer 7-2.

In this case, the sensor chip 1 is held between the inner wall surface 3a on the top face side of the sensor chamber 3 and the inner wall surface 3b on the bottom face side, and so regardless of the high/low pressure relationship between the fluid pressures Pa and Pb, it is pressed against the inner wall surface 3a through the soft adhesive layer 7-1 or against the inner wall surface 3b through the epoxy adhesive layer 7-2. As a result, even if the high/low pressure relationship between the fluid pressures Pa and Pb were to be reversed, the junction portion 4-1 between the stopper 1-2 and the sensor diaphragm 1-1 of the sensor chip 1, and the junction portion 4-2 between the stopper 1-3 and the sensor diaphragm 1-1 will not separate.

Furthermore, in this differential pressure sensor 200A, the soft adhesive layer 7-1 is an adhesive agent layer that has a Young's modulus that is no more than $\frac{1}{1000}$ that of the Young's modulus of the material from which the sensor diaphragm 1 is structured, and the epoxy adhesive layer 7-2 is an adhesive agent layer that has a Young's modulus that is no less than 100 times the Young's modulus of the soft adhesive layer 7-1. Because of this, if heat from the outside is conducted from the inner wall surface 3a or 3b of the sensor chamber 3 to the sensor chip 1, the soft adhesive layer 7-1 will fulfill a role as a layer for mitigating the thermal stress in the tensile (or compressive) direction, mitigating the thermal stress in the tensile (or compressive) direction on the junction surface of the sensor chip 1 that occurs due to differences in the coefficients of thermal expansion. As a result, separation of the junction portions 4-1 and 4-2 of the sensor chip 1 can be avoided even when there is a change in peripheral temperature, rather than just when there is a high-pressure, making it possible to achieve simultaneously both an improvement in pressure durability performance and mitigation of thermal stress in the sensor chip 1.

If both adhesive layers 7-1 and 7-2 were soft adhesive layers, then the sensor chip 1 as a whole would be moved toward the housing 2-1 or 2-2 side by the differential pressure between the pressures Pa and Pb, resulting in inadequate pressing against the inner wall surface 3b or 3a of the sensor chamber 3, which could cause the sensor diaphragm 1-1 to separate from the stopper 1-2 or 1-3. Moreover, if both adhesive layers 7-1 and 7-2 were epoxy layers, then the effect of thermal stress when there is a change in temperature would be large, and thus it is important that the adhesive layers 7-1 and 7-2 be a combination of a soft adhesive layer and an epoxy adhesive layer.

Another Example

Figure 3:
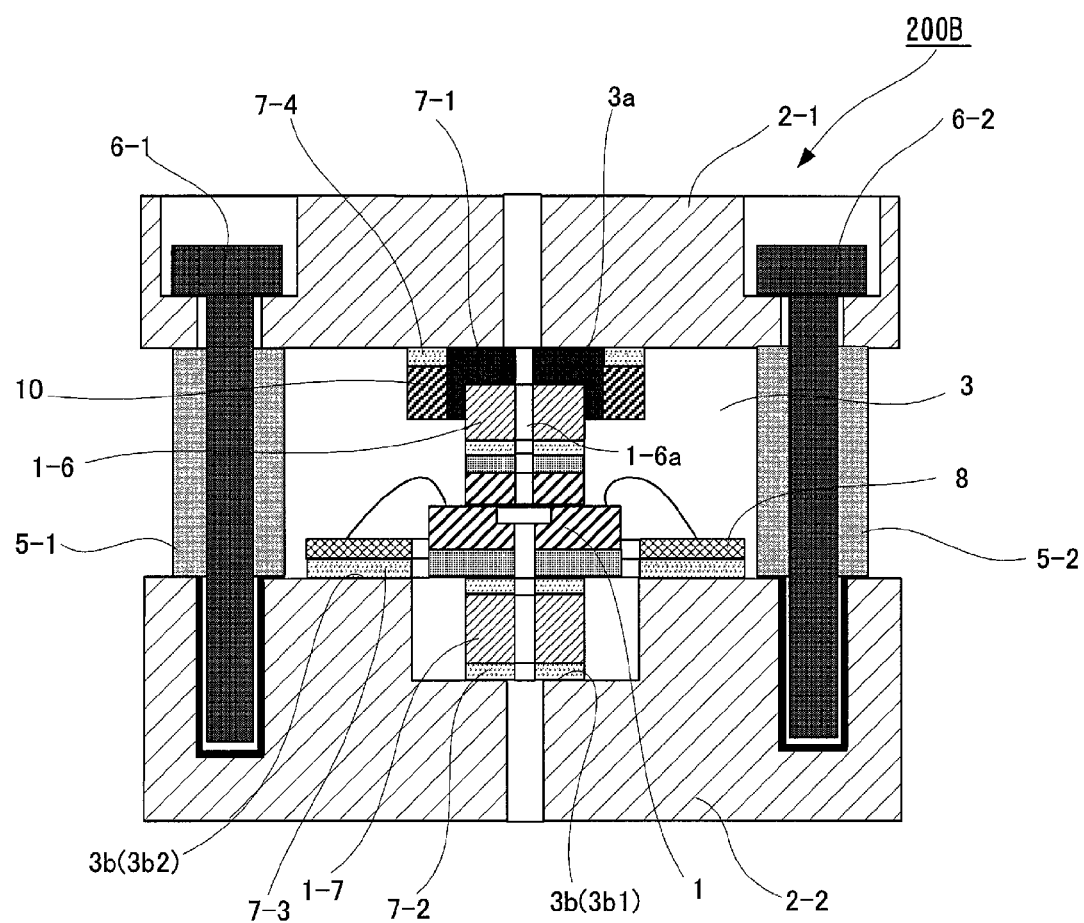
FIG. 3 is a cross-sectional diagram illustrating the critical structures of Another Example of a differential pressure sensor according to the present disclosure.

FIG. 3 illustrates schematically Another Example of a differential pressure sensor according to the present disclosure.

In the differential pressure sensor 200A of the Example, described above, the airtightness after curing is low because the adhesive surface of the soft adhesive layer 7-1 is one face, and so there is a danger that a leak path that will be formed through application of pressure from the inside. Moreover, because the tensile strength of the soft adhesive layer 7-1 after curing is low, the area of adhesion in order to produce adequate strength must be large. Other words, there is the risk that this will produce a problem with difficulty in miniaturization of the constituent components of the structural unit.

Given this, in the differential pressure sensor 200B illustrated in FIG. 3, a washer 10 is used at the junction portion of the soft adhesive layer 7-1, producing multiple adhesive surfaces with the soft adhesive layer 7-1, not only increasing the adhesive area, but also causing the leak path to be bent.

Figure 7:
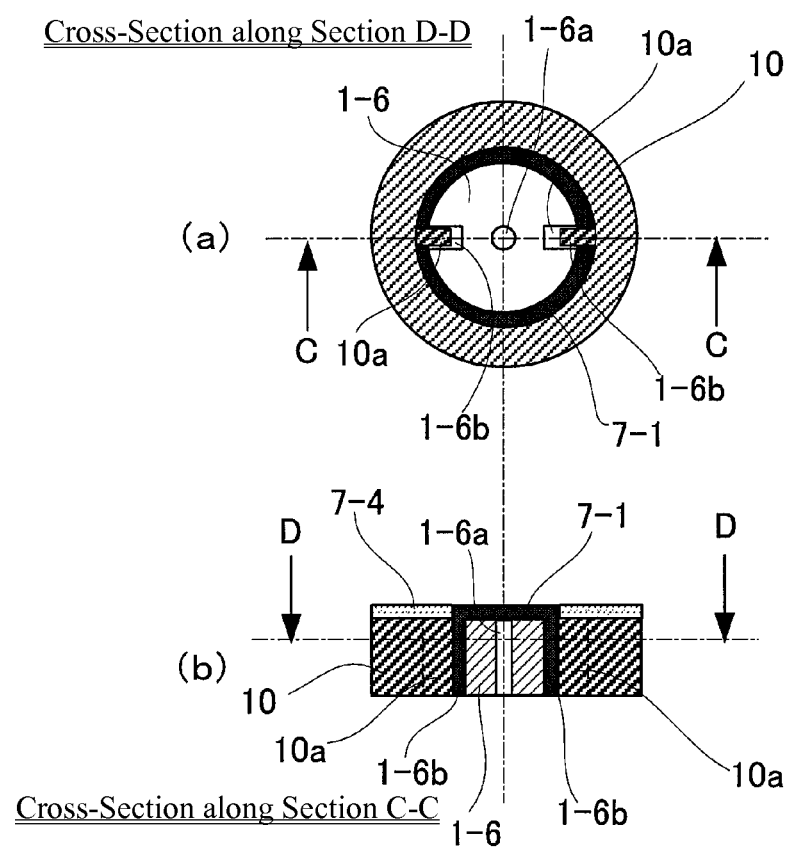
FIG. 7 is a planar sectional diagram (a sectional diagram along the section D-D) and a vertical sectional diagram (a sectional diagram along the section C-C) illustrating the state wherein a washer that is provided with a protrusion on the inner peripheral surface is assembled together with a Kovar pedestal that is provided with a notch in the outer peripheral surface.

That is, in the differential pressure sensor 200B, the washer 10 is adhered through an epoxy adhesive agent to the inner wall surface 3a of the first housing 2-1, and the one face (the top face of the Kovar pedestal 1-6) of the sensor chip 1 is positioned within a space that is surrounded by the inner peripheral surface of the washer 10, where the space that is surrounded by the inner peripheral surface of the washer 10 is filled with a fluorine adhesive agent and subjected to thermal curing. Note that in FIG. 3, 7-4 is an epoxy adhesive agent layer between the inner wall surface 3a of the first housing 2-1 and the washer 10.

As a result, the soft adhesive layer 7-1 is formed in the space that is surrounded by the inner peripheral surface of the washer 10, with the one face (the top face of the Kovar pedestal 1-6) of the sensor chip 1, the inner wall surface 3a (the inner wall surface of the first housing 2-1) of the sensor chamber 3, the inner peripheral surface of the washer 10, and the outer peripheral face (the outer peripheral face of the Kovar pedestal 1-6) that is continuous with the one face of the sensor chip 1 as adhered surfaces, increasing the adhesive area of the soft adhesive 7-1. Moreover, the leak path is bent, protecting against elongation of the leak path, to produce a structure with high airtightness, and a substantial improvement in pressure durability strength.

Yet Another Example

Figure 4:
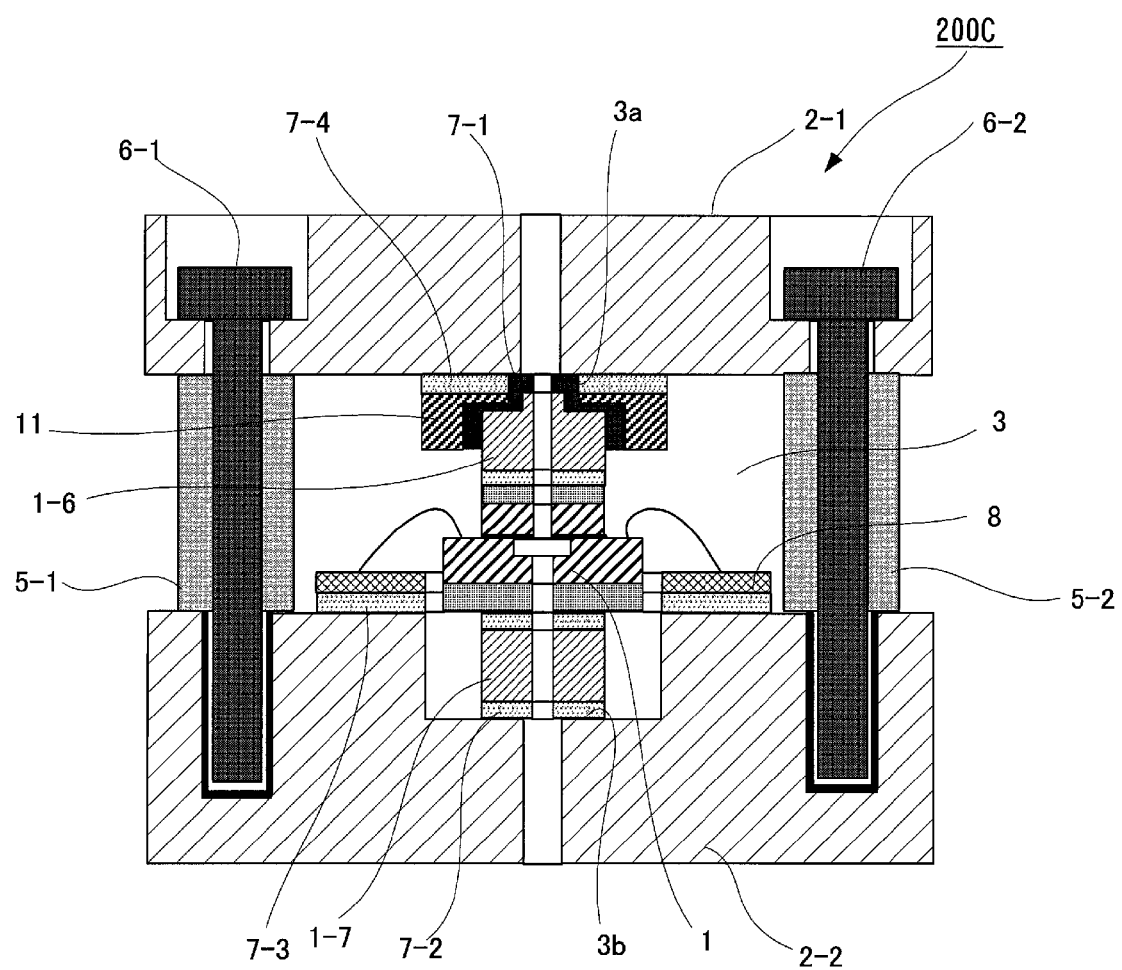
FIG. 4 is a cross-sectional diagram illustrating the critical structures of Yet Another Example of a differential pressure sensor according to the present disclosure.

FIG. 4 illustrates schematically Yet Another Example of a differential pressure sensor according to the present disclosure.

In the differential pressure sensor 200B of the Another Example, described above, a ring-shaped washer 10 wherein the top and bottom faces are open was used in the junction portion of the soft adhesive layer 7-1; however, in the differential pressure sensor 200C of the Yet Another Example, a countersink washer 11 is used in the junction portion of the soft adhesive layer 7-1.

That is, in the differential pressure sensor 200C, the bottom face of the countersink washer 11 is bonded, through an epoxy adhesive agent, to the inner wall surface 3a of the first housing 2-1, and the one face (the top face of the Kovar pedestal 1-6) of the sensor chip 1 is positioned in the space that is surrounded by the inner peripheral surface of the countersink washer 11, and a fluorine adhesive agent is filled into the space that is surrounded by the inner peripheral surface of the countersink washer 11 and then subjected to thermal curing.

As a result, the soft adhesive layer 7-1 is formed in the space that is surrounded by the inner peripheral surface of the countersink washer 11, with the one face (the top face of the Kovar pedestal 1-6) of the sensor chip 1, the inner wall surface 3a (the inner wall surface of the first housing 2-1) of the sensor chamber 3, the inner peripheral surface of the countersink washer 11, the bottom face of the countersink washer 11, and the outer peripheral face (the outer peripheral face of the Kovar pedestal 1-6) that is continuous with the one face of the sensor chip 1 as adhered surfaces, increasing the adhesive area of the soft adhesive 7-1, and also increasing the number of bends in the leak path, further increasing air-tightness.

Figure 5:
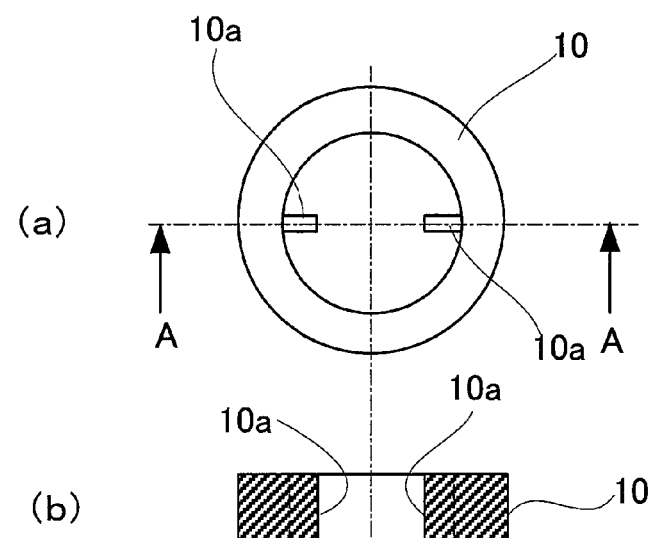
FIG. 5 is a plan view diagram and a cross-sectional diagram (a cross-sectional diagram along the section A-A) illustrating an example of the interior peripheral surface of a washer used in the differential pressure sensor according to the Another Example.
Figure 6:
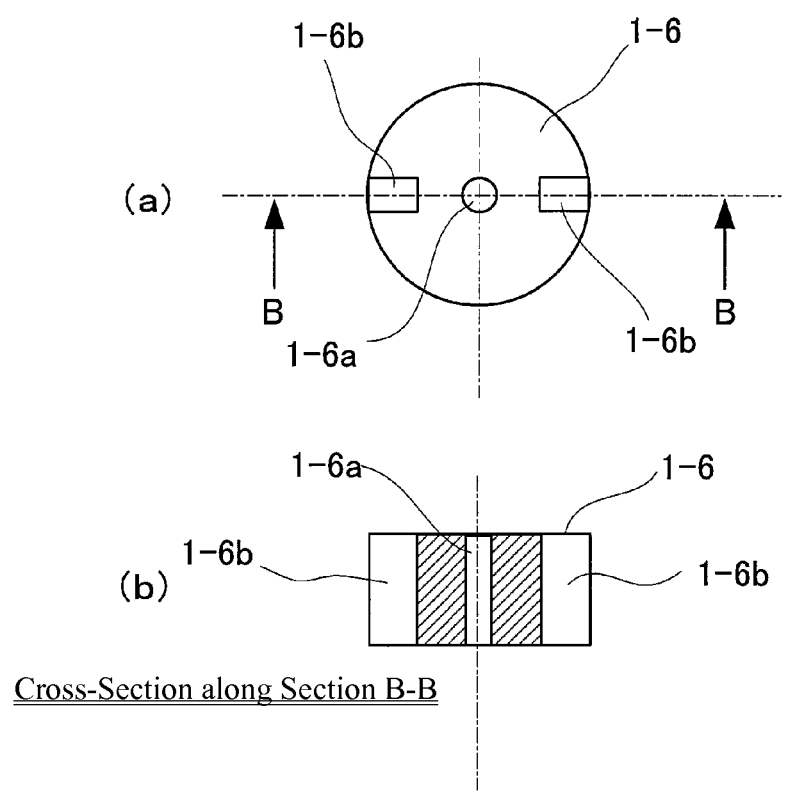
FIG. 6 is a plan view diagram and a cross-sectional diagram (a cross-sectional diagram along the section B-B) illustrating an example wherein a notch is provided in the outer peripheral surface of a Kovar pedestal used in the differential pressure sensor according to the Another Example.

Note that, for example, in the differential pressure sensor 200B of the Another Example (FIG. 3), protrusions 10a and 10a may be provided on the inner peripheral surface of the washer 10, as illustrated in FIG. 5, notches 1-6b and 1-6b may be provided on the outer peripheral surface of the Kovar pedestal 1-6, as illustrated in FIG. 6, the washer 10 and the Kovar pedestal 1-6 may be combined by mating the protruding portions 10a and 10a and the notches 1-6b and 1-6b, as illustrated in FIG. 7, and the soft adhesive layer 7-1 may be formed in the space that is surrounded by the inner peripheral surface of the washer 10. Such a structure further increase in the area of the soft adhesive layer 7-1, increasing the tensile ring after curing. This same structure may also be employed in the differential pressure sensor 200C of the Yet Another Example (FIG. 4).

Moreover, in the differential pressure sensor 200B of the Another Example, the thermal mitigation effect can be increased further through the use of a material, for the material for the washer 10, wherein the coefficient of linear expansion is between the coefficient of linear expansion of the one face (top face of the Kovar pedestal 1-6) of the sensor chip 3 and the coefficient of linear expansion of the inner wall surface 3a (the inner wall surface of the first housing 2-1) of the sensor chip 1. For example, in the case of SUS303 or 304 and Kovar, the material for the washer 10 may be SUS430, the like. The same can be said for the countersink washer 11 in the differential pressure sensor 200C of the Yet Another Example.

Method for Manufacturing the Differential Pressure Sensor

The differential pressure sensor 200B of the Another Example will be used as an example next, to explain a method for manufacturing the differential pressure sensor 200B.

Step 1

Figure 8:
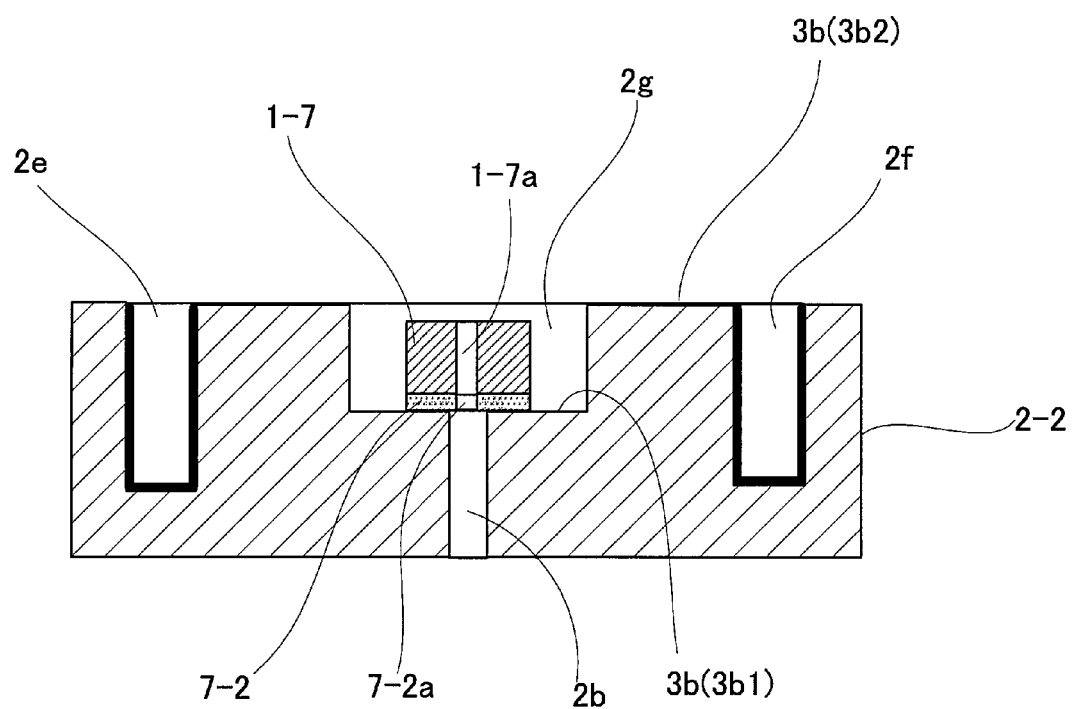
FIG. 8 is a diagram for explaining a first step when manufacturing the differential pressure sensor according to the Another Example.

First, as illustrated in FIG. 8, an epoxy adhesive agent is coated onto the bottom face of the Kovar pedestal 1-7 (the other face of the sensor chip 1) and subjected to thermal curing to join it to the inner wall surface 3b of the second housing 2-2 (the bottom face 3b1 of the stepped hole 2g). This forms an epoxy adhesive layer 7-2 between the inner wall surface 3b of the second housing 2-2 (the bottom face 3b1 of the stepped hole 2g) and the other face of the sensor chip 1 (the bottom face of the Kovar pedestal 1-7).

Step 2

Figure 9:
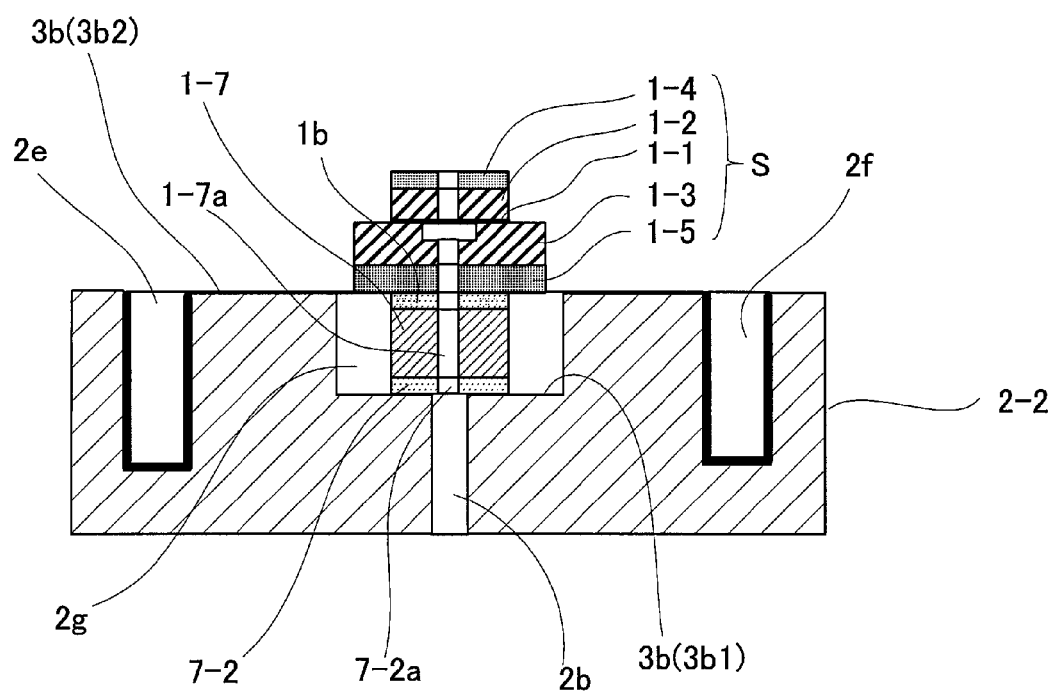
FIG. 9 is a diagram for explaining a second step when manufacturing the differential pressure sensor according to the Another Example.

Following this, as illustrated in FIG. 9, the bottom face of the sensor portion S that is an assembly of the sensor diaphragm 1-1, the stoppers 1-2 and 1-3, and the glass pedestals 1-4 and 1-5 (the bottom face of the glass pedestal 1-5) is coated with an epoxy adhesive agent and subjected to thermal curing to be bonded to the top face of the Kovar pedestal 1-7 that is joined to the inner wall surface 3b of the second housing 2-2 (the bottom face 3b1 of the stepped hole 2g). This forms the epoxy agent layer 1b between the bottom face of the sensor portion S (the bottom face of the glass pedestal 1-5) and the top face of the Kovar pedestal 1-7.

Step 3

Figure 10:
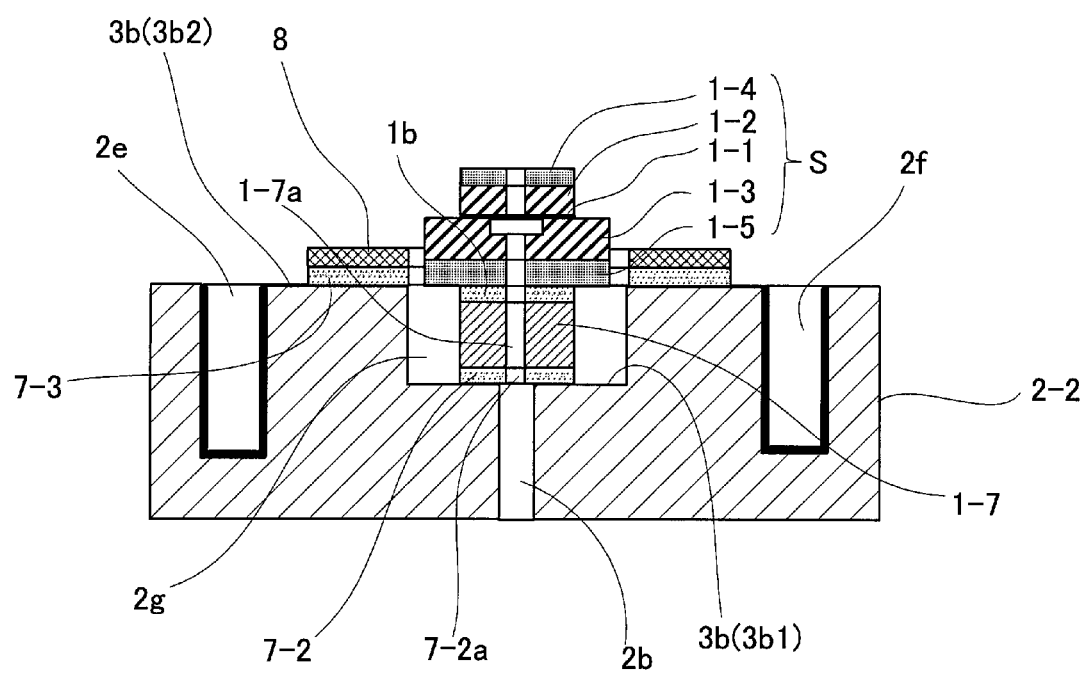
FIG. 10 is a diagram for explaining a third step when manufacturing the differential pressure sensor according to the Another Example.

Following this, as illustrated in FIG. 10, the printed substrate 8 is coated with an epoxy adhesive agent and then subjected to thermal curing to be bonded to the inner wall surface 3b of the second housing 2-2 (the peripheral edge face 3b2 of the stepped hole 2g). This forms the epoxy adhesive agent layer 7-3 between the printed substrate 8 and the inner wall surface 3b of the second housing 2-2 (the peripheral edge 3b2 of the stepped hole 2g), securing the printed substrate 8 to the inner wall surface 3b of the second housing 2-2 (the peripheral edge face 3b2 of the stepped hole 2g).

Step 4

Figure 11:
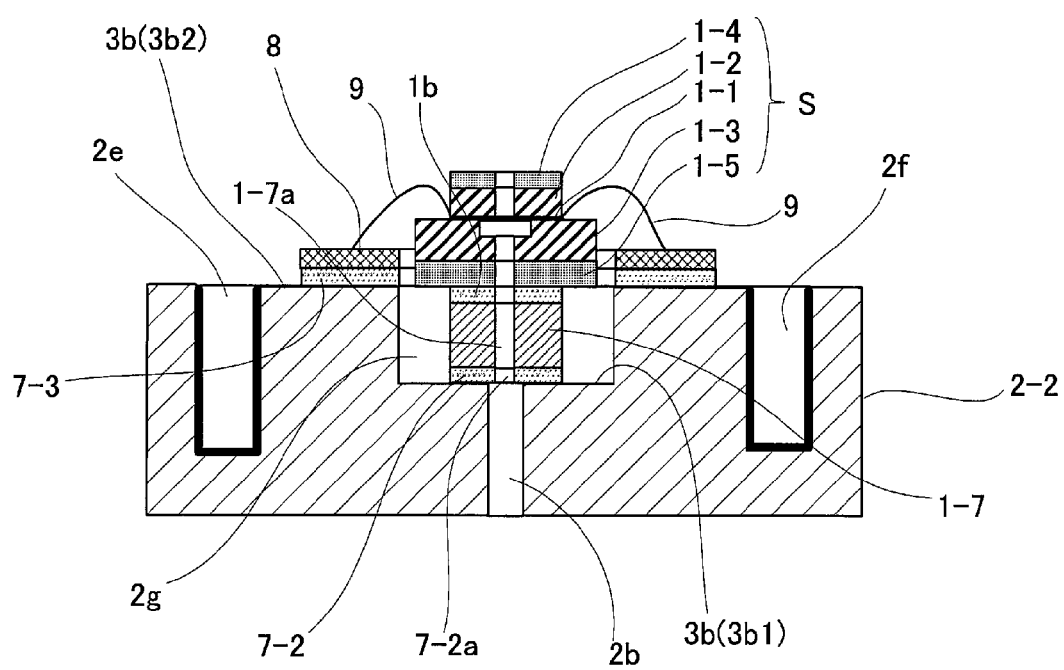
FIG. 11 is a diagram for explaining a fourth step when manufacturing the differential pressure sensor according to the Another Example.

Following this, as illustrated in FIG. 11, the printed substrate 8, which is secured to the inner wall surface 3b of the second housing (the peripheral edge face 3b2 of the stepped hole 2g) and the sensor portion S that is joined to the top face of the Kovar pedestal 1-7 are connected electrically through the wire bonding 9.

Step 5

Figure 12:
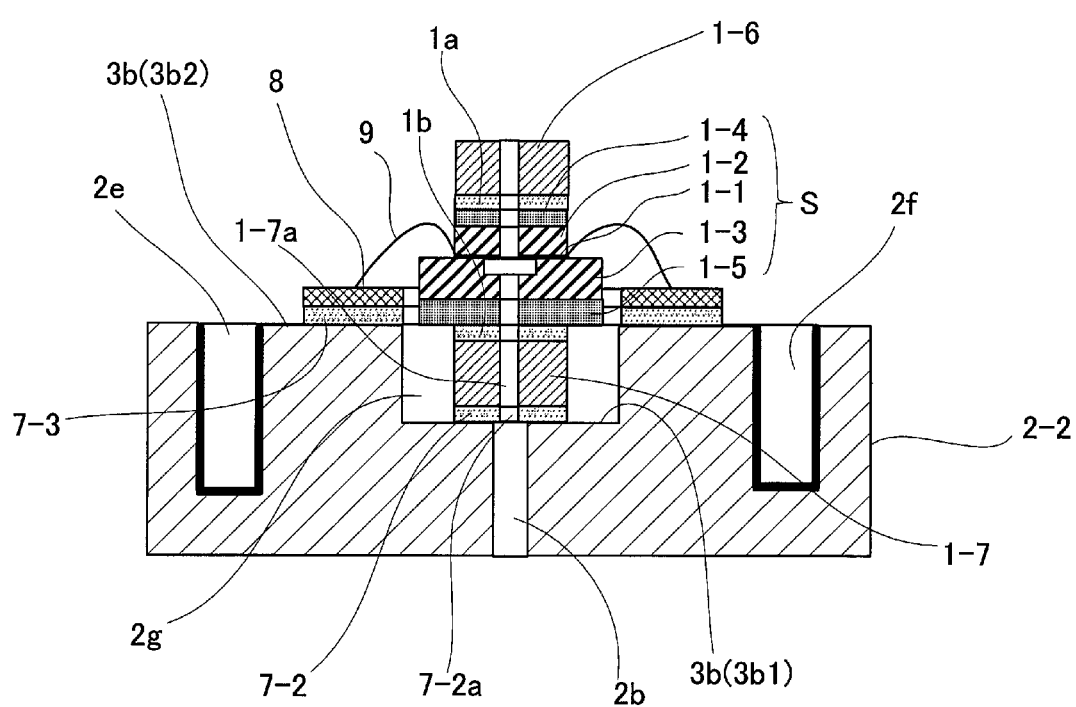
FIG. 12 is a diagram for explaining a fifth step when manufacturing the differential pressure sensor according to the Another Example.

Following this, as illustrated in FIG. 12, the bottom face of the Kovar pedestal 1-6 is coated with an epoxy adhesive agent and subjected to thermal curing to be joined to the sensor portion S (the top face of the glass pedestal 1-4) that is joined to the top face of the Kovar pedestal 1-7. This forms the epoxy adhesive agent layer 1a between the top face of the sensor portion S (the top face of the glass pedestal 1-4) and the bottom face of the Kovar pedestal 1-6.

Step 6

Figure 13:
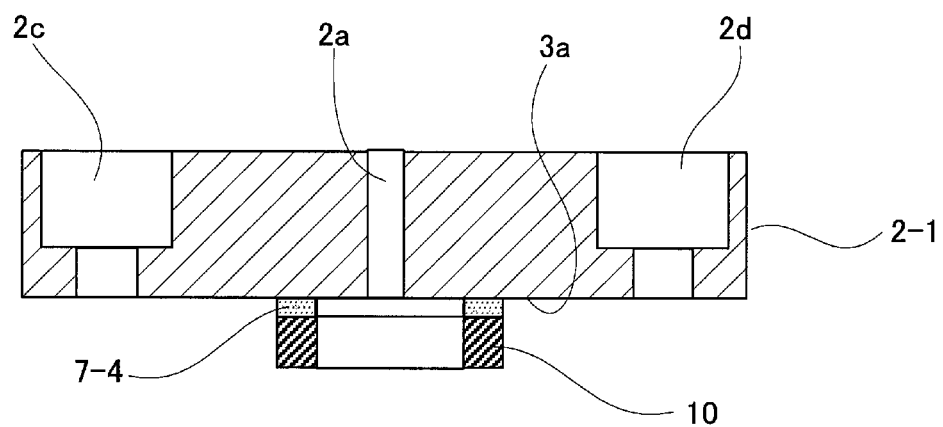
FIG. 13 is a diagram for explaining a sixth step when manufacturing the differential pressure sensor according to the Another Example.

Following this, as illustrated in FIG. 13, the washer 10 is coated with an epoxy adhesive agent and subjected to thermal curing to be joined to the inner wall surface 3a of the first housing 2-1. This forms the epoxy adhesive agent 7-4 between the inner wall surface 3a of the first housing 2-1 and the washer 10. Note that the operation in Step 6 need not necessarily be performed after Step 5, but rather can be formed at any stage as long as it is prior to Step 9, described below.

Step 7

Figure 14:
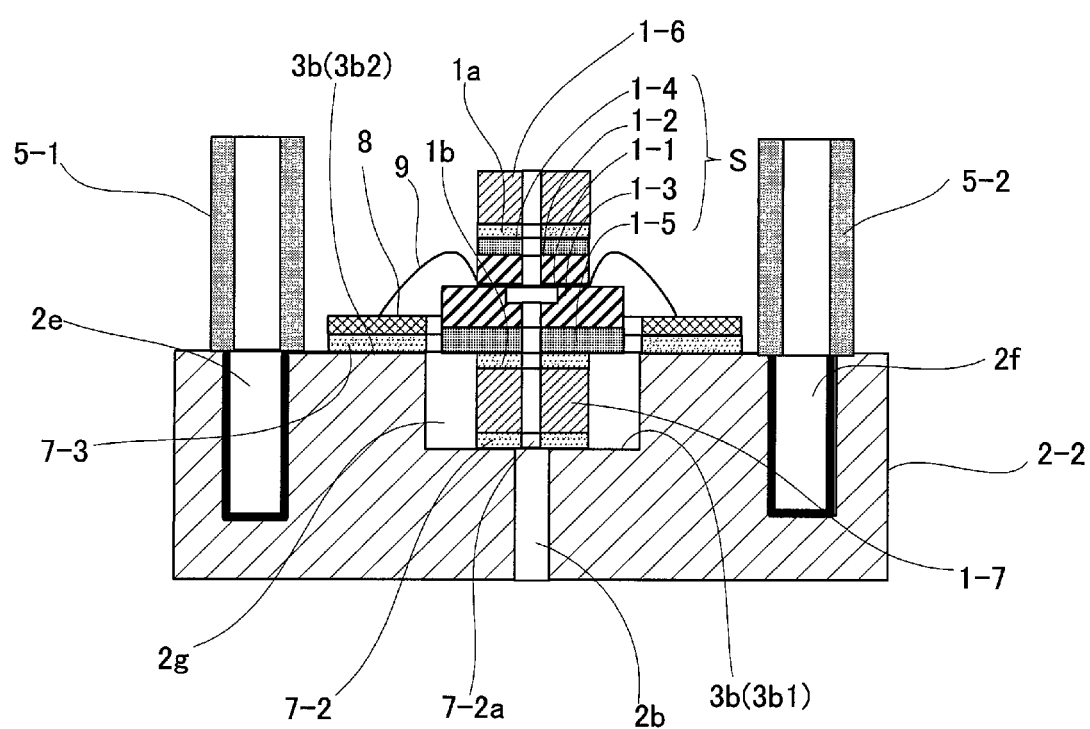
FIG. 14 is a diagram for explaining a seventh step when manufacturing the differential pressure sensor according to the Another Example.

Following this, as illustrated in FIG. 14, cylindrical spacers 5-1 and 5-2 are placed on the inner wall surface 3b of the second housing 2-2 (the peripheral edge face about 3b2 of the stepped hole 2g) wherein the electrical connection was made between the printed substrate 8 and the sensor portion S.

Step 8

Figure 15:
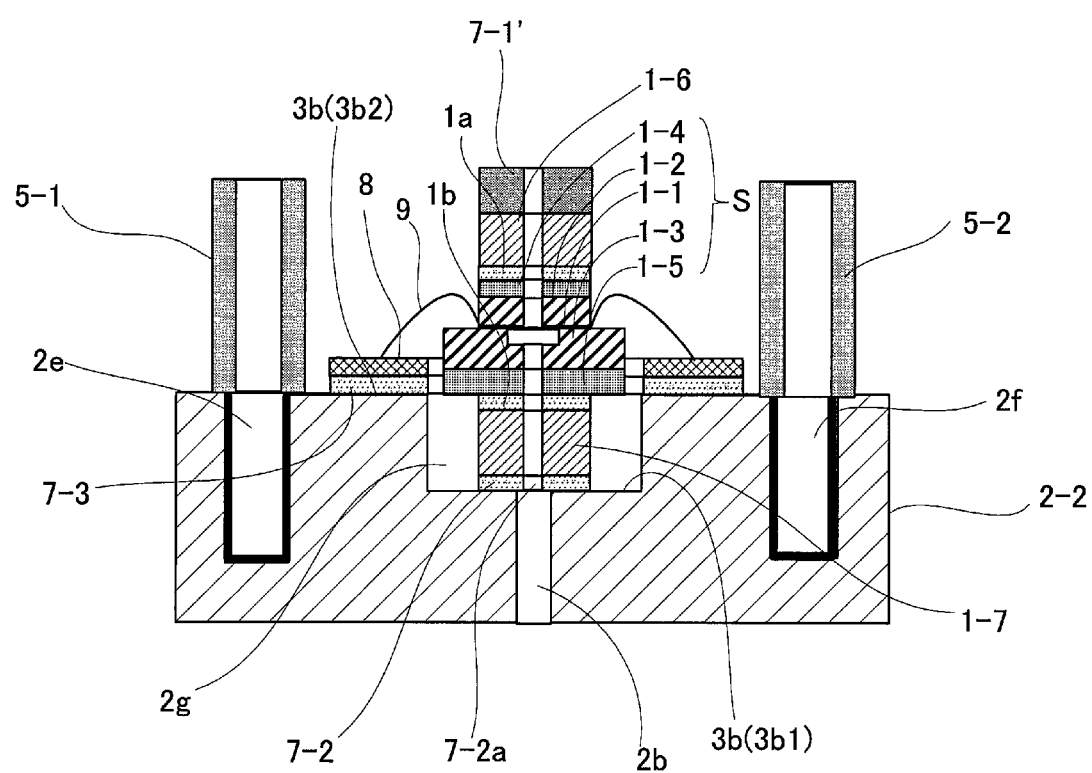
FIG. 15 is a diagram for explaining an eighth step when manufacturing the differential pressure sensor according to the Another Example.

Following this, as illustrated in FIG. 15, a fluorine adhesive agent 7-1' is coated onto the Kovar pedestal 1-6 that is joined to the top face of the sensor portion S (the top face of the glass pedestal 1-4).

Step 9

Figure 16:
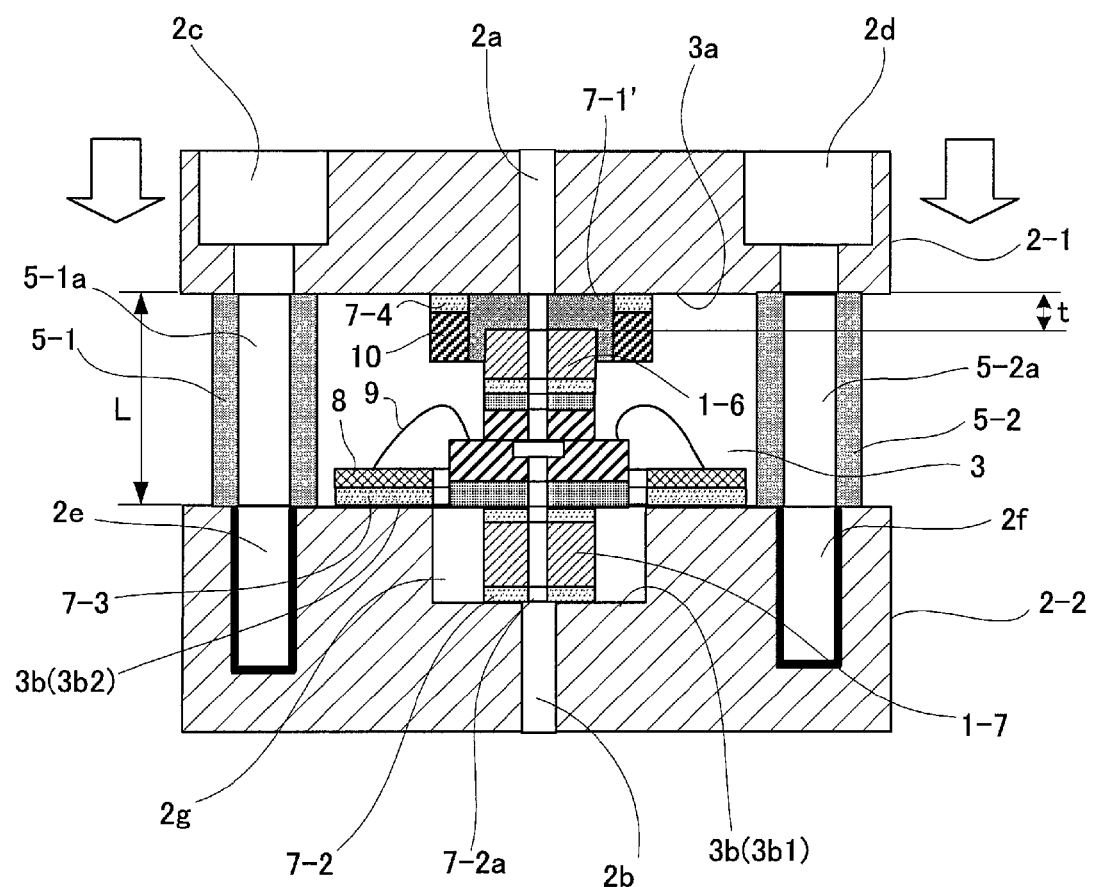
FIG. 16 is a diagram for explaining a ninth step when manufacturing the differential pressure sensor according to the Another Example.

Following this, as illustrated in FIG. 16, the second housing 2-2 (of the FIG. 15) on which the cylindrical spacers 5-1 and 5-2 have been placed and whereon the fluorine adhesive agent 7-1' was coated onto the top face of the Kovar pedestal 1-6 is combined with the first housing 2-1 (in FIG. 13) onto which the washer 10 is secured, and the top face of the Kovar pedestal 1-6 is positioned within the space that is surrounded by the inner peripheral surface of the washer 10.

Because this is prior to thermal curing, the fluorine adhesive agent 7-1' on the top face of the Kovar pedestal 1-6 is forced into the space that is surrounded by the inner peripheral surface of the washer 10, and flows into the space on the outer peripheral surface that is continuous with the top face of the Kovar pedestal 1-6. Moreover, the thickness t of the fluorine adhesive agent 7-1' at this time between the top face of the Kovar pedestal 1-6 and the inner wall surface 3a of the first housing 2-1 is determined by the length L of the spacers 5-1 and 5-2, to ensure that the design thickness t.

Step 10

Figure 17:
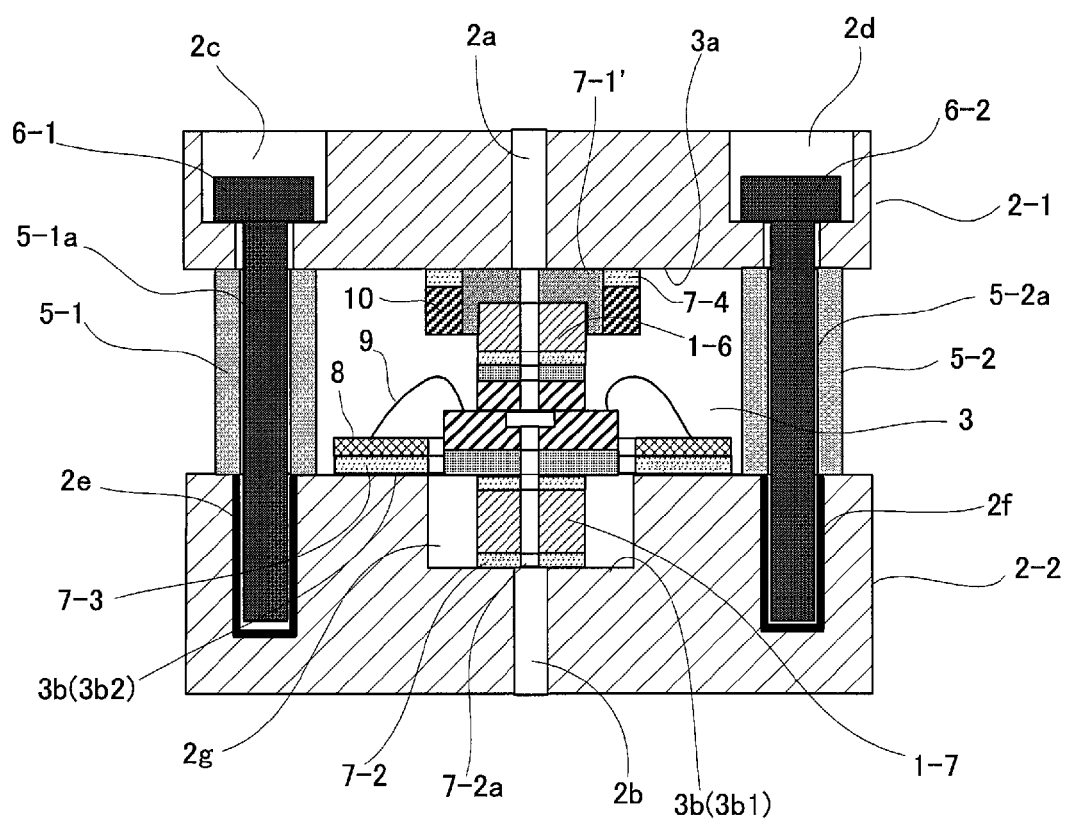
FIG. 17 is a diagram for explaining a $10^{th}$ step when manufacturing the differential pressure sensor according to the Another Example.

Following this, as illustrated in FIG. 17, the first housing 2-1, which was assembled in Step 9, and the second housing 2-2 are fastened securely together through bolts 6-1 and 6-2 onto the cylindrical spacers 5-1 and 5-2.

Step 11

Figure 18:
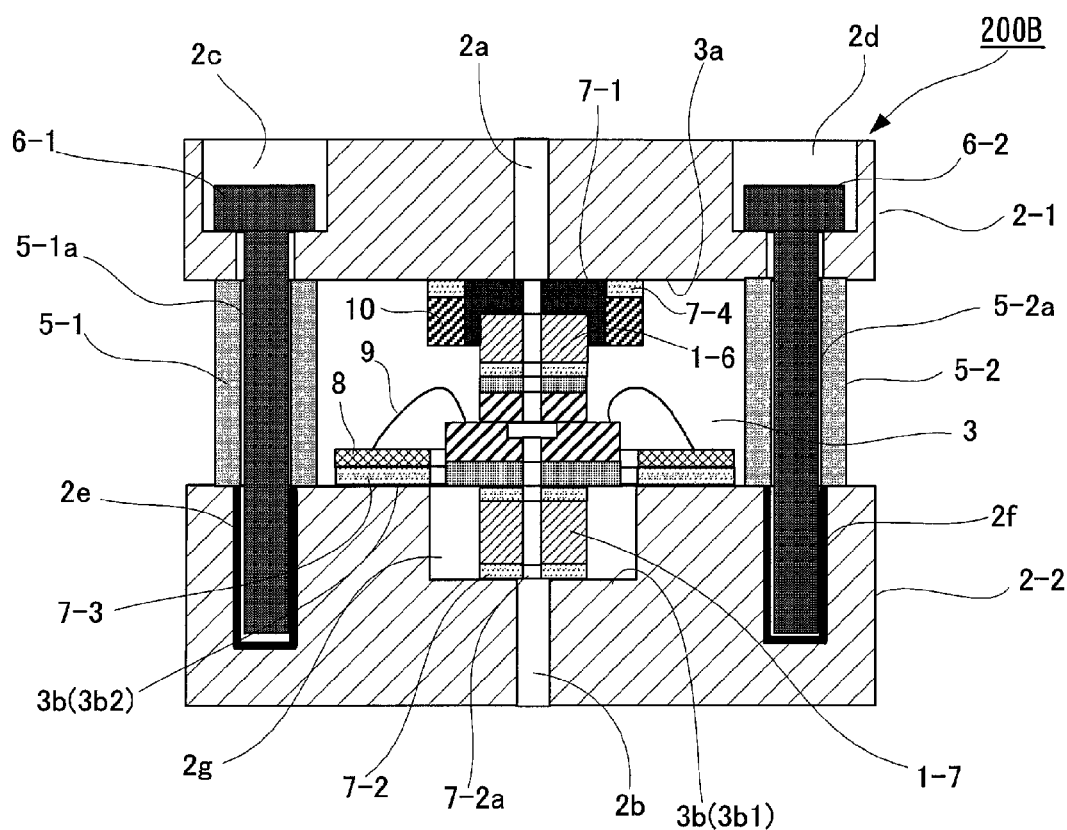
FIG. 18 is a diagram for explaining a $11^{th}$ step when manufacturing the differential pressure sensor according to the Another Example.

Following this, the fluorine adhesive agent 7-1' is subjected to thermal curing in a state wherein the first housing 2-1 and the second housing 2-2 are secured together, to join the top face of the Kovar pedestal 1-6 (the one face of the sensor chip 1) to the inner wall surface 3b of the first housing 2-1. This forms the soft adhesive layer 7-1 within the space that is surrounded by the inner peripheral surface of the washer 10, as illustrated in FIG. 18, with the one face of the sensor chip 1 (the top face of the Kovar pedestal 1-6), the inner wall surface 3a of the sensor chamber 3 (the inner wall surface of the first housing 2-1), the inner peripheral surface of the washer 10, and the outer peripheral surface that is continuous with the one surface of the sensor chip 1 (the outer peripheral surface of the Kovar pedestal 1-6) as the adhered surfaces.

Figure 19:
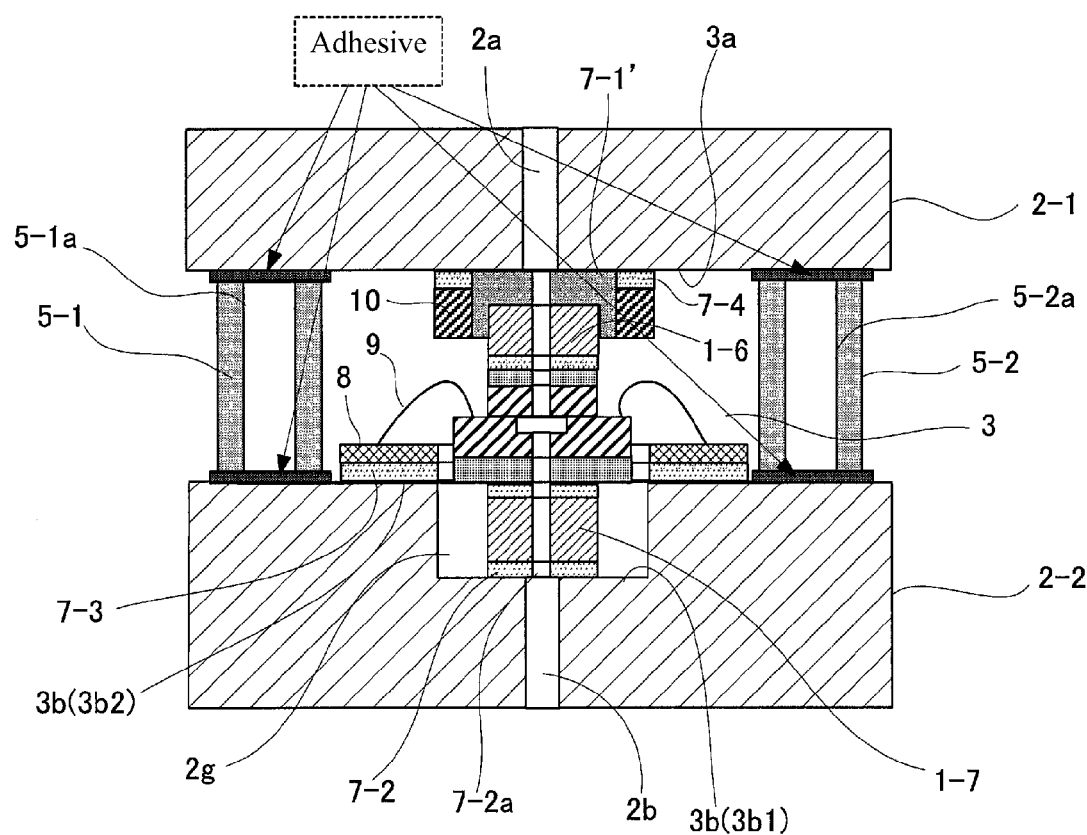
FIG. 19 is a diagram illustrating an example wherein a spacer is bonded through an adhesive agent between the first housing and the second housing in the differential pressure sensor according to the Another Example.
Figure 20:
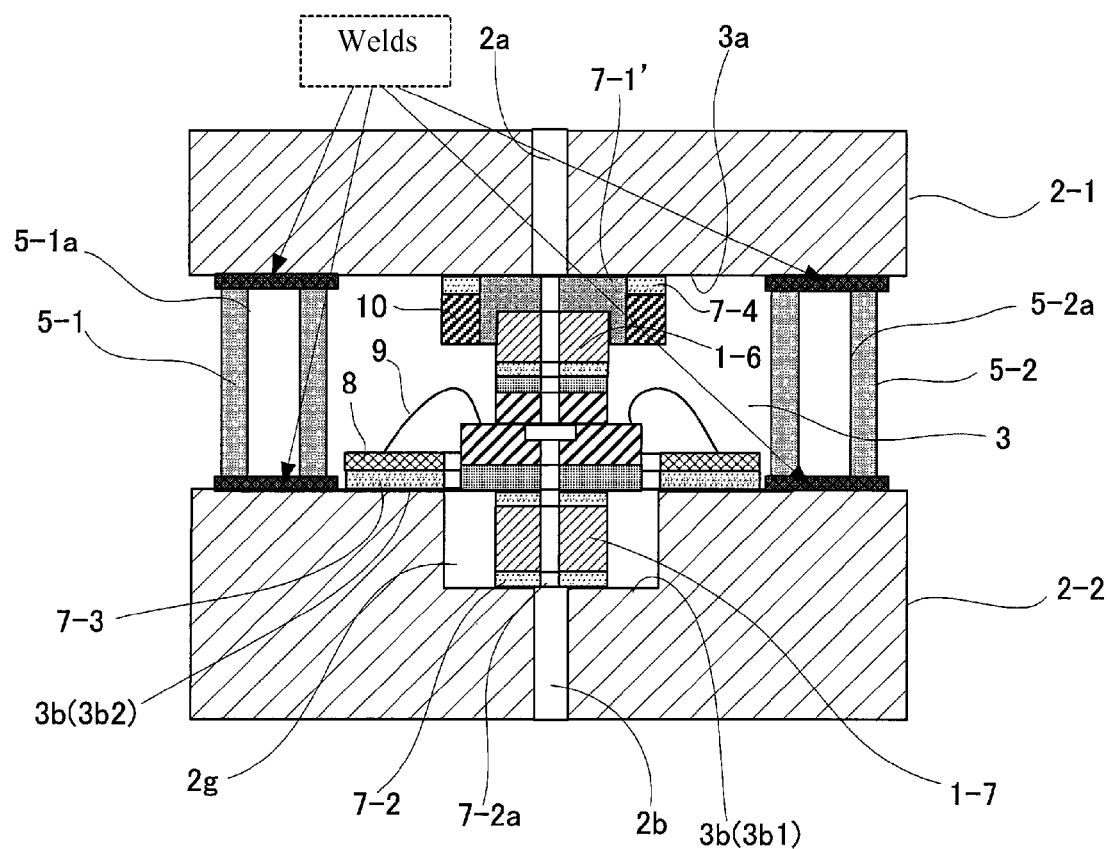
FIG. 20 is a diagram illustrating an example wherein a spacer is bonded through welding between the first housing and the second housing in the differential pressure sensor according to the Another Example.

Note that while in the example set forth above, the first housing 2-1 and the second housing 2-2 were fastened securely through the bolts 6-1 and 6-2 to the cylindrical spacers 5-1 and 5-2, but, for example, as illustrated in FIG. 19, the spacers 5-1 and 5-2 may be secured between the first housing 2-1 and the second housing 2-2 using an adhesive agent, or, as illustrated in FIG. 20, the spacers 5-1 and 5-2 may be joined through welding.

Note that when securing the spacers 5-1 and 5-2 using an adhesive agent it is necessary to secure the spacers 5-1 and 5-2 prior to the thermal curing of the fluorine adhesive agent 7-1', and thus for the adhesive agent for securing the spacers 5-1 and 5-2, an adhesive agent with a curing temperature that is lower than that of the fluorine adhesive agent 7-1' (for example, a quick curing adhesive agent that cures at room temperature) is used. Moreover, while the spacers 5-1 and 5-2 in the examples illustrated in FIG. 19 in FIG. 20 were cylindrical, the spacers 5-1 and 5-2 do not need to be cylindrical because there is no need to pass bolts therethrough.

Figure 21:
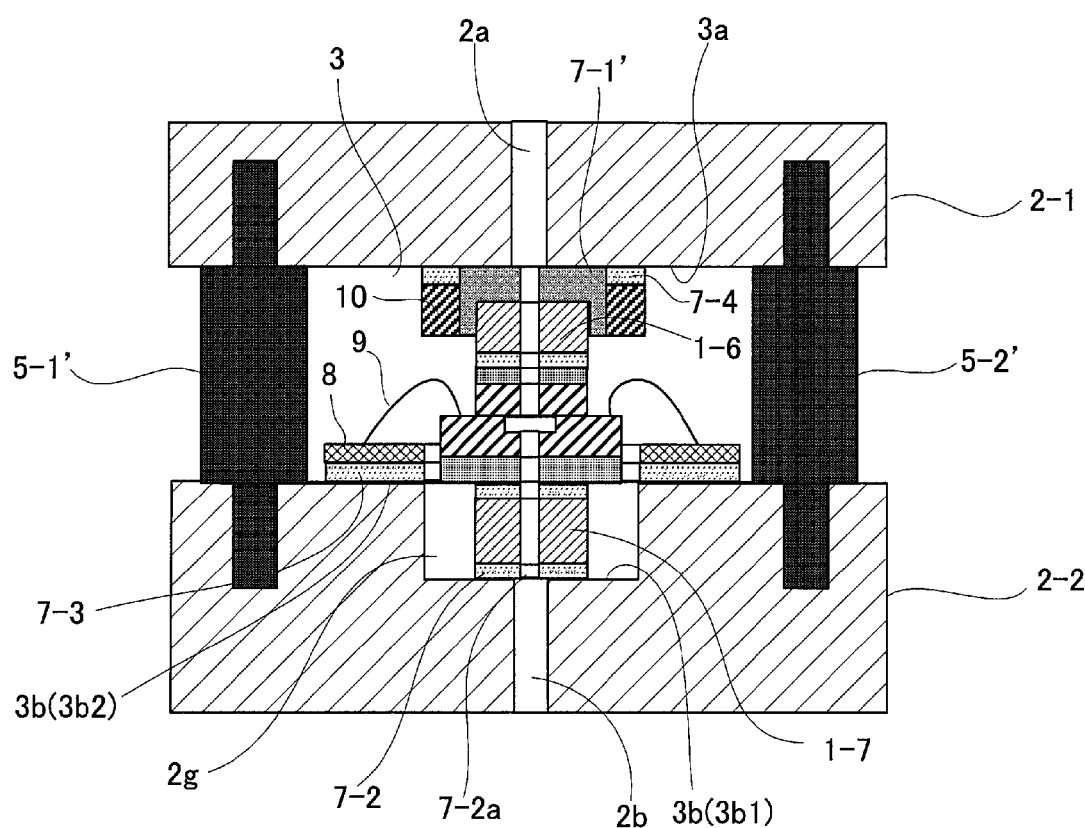
FIG. 21 is a diagram illustrating an example wherein a spacer is bonded through press fitting between the first housing and the second housing in the differential pressure sensor according to the Another Example.

Furthermore, the first housing 2-1 and the second housing 2-2 may be secured together, with spacers 5-1' and 5-2' interposed therebetween, by using pin-shaped spacers 5-1' and 5-2' that are provided with protruding portions at the top and the bottom, as illustrated in FIG. 21, and press fitting using fitting of the protruding portions of the pin-shaped spacers 5-1' and 5-2'.

Figure 22:
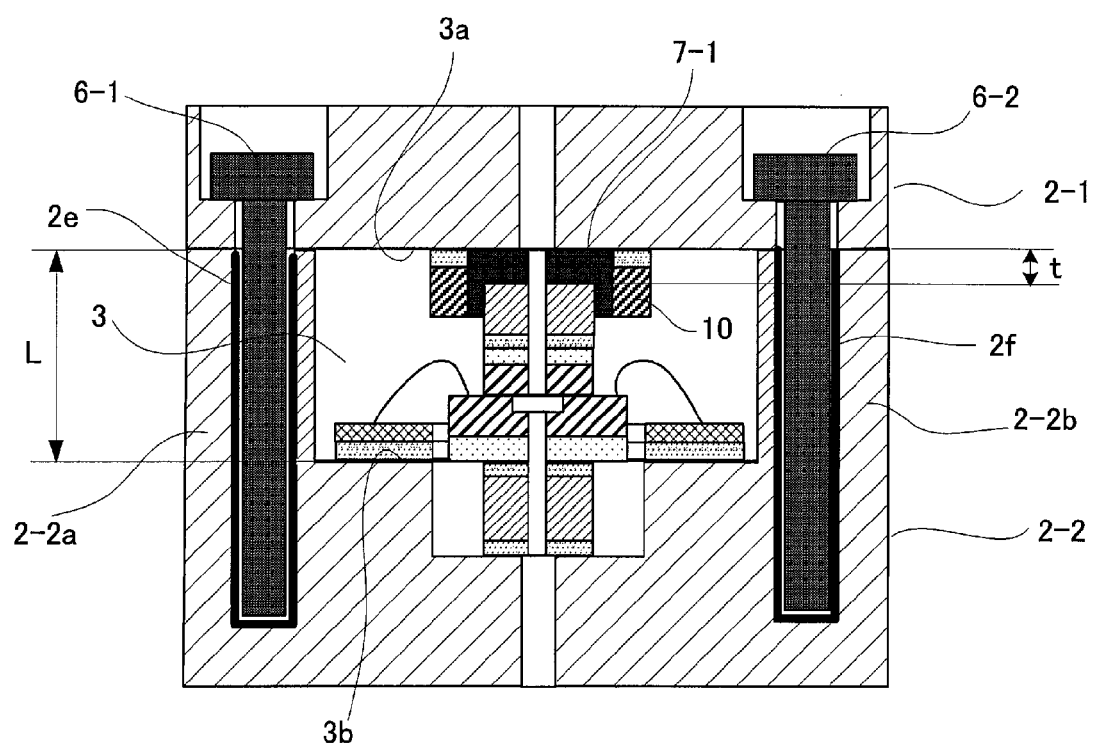
FIG. 22 is a diagram illustrating an example wherein the first housing and the second housing in the differential pressure sensor according to the Another Example are fastened and secured through increasing the height of the periphery of the inner wall surface of the second housing, without using a spacer.

Furthermore, while in the example set forth above there were two spacers provided between the first housing 2-1 and the second housing 2-2, there is not necessarily a limit to just 2. Moreover, spacers need not necessarily be used, but rather, as illustrated in FIG. 22, the periphery surrounding the sensor chamber 3 of the inner wall surface 3b of the second housing 2-2, for example, may be increased in height, with screw holes 2e and 2f provided in the high peripheral walls 2-2a and 2-2b, to secure the first housing 2-1 and the second housing 2-2 by threading the bolts 6-1 and 6-2 into the screw holes 2e and 2f. In this case, the thickness t of the soft adhesive layer 7-1 is determined by the height H of the peripheral walls 2-2a and 2-2b that surround the sensor chamber 3 of the inner wall surface 3b of the housing 2-2.

Note that when the surrounding walls 2-2a and 2-2b at the periphery of the sensor chamber 3 of the inner wall surface 3b of the second housing 2-2 are joined together in a ring shape to form a single wall, then a notch is provided in the wall through which to pass the interconnections. In a type wherein spacers 5-1 and 5-2 are provided between the first housing 2-1 and the second housing 2-2, the spacers 5-1 and 5-2, as columns, open up, to the outside, the sensor chamber 3, which is formed between the first housing 2-1 and the second housing 2-2, where this open space fulfills the role of the notch through which the interconnection is passed. Consequently, there is no need to provide in particular a notch through which to pass the interconnections, making the interconnection operation easy as well.

Moreover, while in the examples set forth above the sensor diaphragm 1-1 was of a type wherein a strain resistance gauge was formed wherein there is a change in resistance value in accordance with the change in pressure, the sensor chip may be of an electrostatic capacitance type instead. An electrostatic capacitance sensor chip includes a substrate that is provided with a specific space (a capacitance chamber), a diaphragm that is provided on the space of the substrate, a stationary electrode that is formed on the substrate, and a movable electrode that is formed on the diaphragm. When the diaphragm deforms due to the application of pressure, the distance between the movable electrode and the stationary electrode changes, causing a change in the electrostatic capacitance over that space.

Extended Examples

While the present disclosure has been explained above in reference to the examples, the present disclosure is not limited to the examples set forth above. The structures and details in the present disclosure may be varied in a variety of ways, as can be understood by one skilled in the art, within the scope of technology in the present disclosure. Moreover, the present disclosure may be embodied through combining the various examples, insofar as there are no contradictions.

The invention claimed is:

1. A differential pressure sensor comprising:
a sensor chip having:
   a sensor diaphragm that outputs a signal in accordance with a difference in pressures borne by one face and other face;
   a first retaining member, bonded facing a peripheral edge portion of the one face of the sensor diaphragm, and having a first pressure guiding hole for guiding a first fluid pressure to the one face of the sensor diaphragm; and
   a second retaining member, bonded facing a peripheral edge portion of the other face of the sensor diaphragm, and having a second pressure guiding hole for guiding a second fluid pressure to the other face of the sensor diaphragm; and
a sensor housing having:
   a sensor chamber that contains the sensor chip;
   a first pressure guiding duct that guides the first fluid pressure to a first inner wall surface of the sensor chamber; and
   a second pressure guiding duct that guides the second fluid pressure to a second inner wall surface of the sensor chamber; wherein:
the sensor chip, between a first inner wall surface and a second inner wall surface of the sensor chamber, is joined by a first adhesive agent layer between one face of the sensor chip and the first inner wall surface of the sensor chamber and joined through a second adhesive agent layer between other face of the sensor chip and the second inner wall surface of the sensor chamber;

the first adhesive agent layer is an adhesive agent layer that has a Young's modulus that is smaller than the Young's modulus of a material that structures the sensor diaphragm; and the second adhesive agent layer is an adhesive agent layer that has a Young's modulus that is smaller than the Young's modulus of the material that structures the sensor diaphragm and larger than the Young's modulus of the first adhesive agent layer.

2. The differential pressure sensor as set forth in claim 1, further comprising:
a washer that is secured to the first inner wall surface of the sensor chamber, wherein:
the one face side of the sensor chip is positioned within a space that is surrounded by an inner peripheral surface of the washer; and
the first adhesive agent layer is formed within the space surrounded by the inner peripheral surface of the washer, and has, as adhered surfaces, the one face of the sensor chip, the first inner wall surface of the sensor chamber, and the inner peripheral surface of the washer, and the outer peripheral surface of the washer that is continuous with the one surface of the sensor.

3. The differential pressure sensor as set forth in claim 2, wherein:
the washer is a countersink washer; and
the first adhesive agent layer is formed in the space surrounded by the inner peripheral surface of the countersink washer and has, as adhered surfaces, the one face of the sensor chip, the first inner wall surface of the sensor chamber, the inner peripheral surface of the countersink washer, the inner bottom face of the countersink washer, and the outer peripheral surface of the countersink washer that is continuous with the one face of the sensor chip.

4. The differential pressure sensor as set forth in claim 2, wherein:
the coefficient of linear expansion of the washer has a value that is between the coefficient of linear expansion of the one face of the sensor chip and the coefficient of linear expansion of the first inner wall surface of the sensor chamber.

5. The differential pressure sensor as set forth in claim 1, wherein:
the sensor housing is structured with a divided structure of a first housing that has a first wall surface that is the first inner wall surface of the sensor chamber and a second wall surface that is the second inner wall surface of the sensor chamber; and
the first housing and the second housing are assembled together with a spacer interposed therebetween.

6. The differential pressure sensor as set forth in claim 5, wherein:
the spacer is a cylindrical spacer; and
the first housing and the second housing are fastened securely through a bolt through the cylindrical spacer.

7. The differential pressure sensor as set forth in claim 1, wherein:
the first adhesive agent layer is an adhesive agent layer having a Young's modulus of no more than $1/1000$ the Young's modulus of the material that structures the sensor diaphragm; and
the second adhesive agent layer is an adhesive agent layer having a Young's modulus that is no less than 100 times the Young's modulus of the first adhesive agent layer.

8. A differential pressure sensor manufacturing method for a differential pressure sensor that includes:

a sensor chip having:
a sensor diaphragm that outputs a signal in accordance with a difference in pressures borne by one face and other face;
a first retaining member, bonded facing a peripheral edge portion of the one face of the sensor diaphragm, and having a first pressure guiding hole for guiding a first fluid pressure to the one face of the sensor diaphragm; and
a second retaining member, bonded facing a peripheral edge portion of the other face of the sensor diaphragm, and having a second pressure guiding hole for guiding a second fluid pressure to the other face of the sensor diaphragm; and
a sensor housing having:
a sensor chamber that contains the sensor chip;
a first pressure guiding duct that guides the first fluid pressure to a first inner wall surface of the sensor chamber; and
a second pressure guiding duct for guiding the second fluid pressure to a second inner wall surface of the sensor chamber, the sensor housing having a divided structure of a first housing that has a first wall surface that is the first inner wall surface of the sensor chamber and a second wall surface that is the second inner wall surface of the sensor chamber; wherein the first adhesive agent layer is an adhesive agent layer that has a Young's modulus that is smaller than the Young's modulus of a material that structures the sensor diaphragm; and
the second adhesive agent layer is an adhesive agent layer that has a Young's modulus that is smaller than the Young's modulus of the material that structures the sensor diaphragm and larger than the Young's modulus of the first adhesive agent layer; and
between a first wall surface of the first housing and a second wall surface of the second housing, one face of the sensor chip is joined by a first adhesive agent layer to the first wall surface of the first housing and the other face of the sensor chip is joined by a second adhesive agent layer to the second wall surface of the second housing, the method comprising the steps for:
coating the bottom face of the second pedestal, as the other face of the sensor chip, with the second adhesive agent and curing to join to the second wall surface of the second housing;
joining an assembly of a sensor diaphragm, a stopper, and a glass pedestal, as the sensor chip sensor portion, to the top face of the second pedestal that is joined to the second wall surface of the second housing;
securing a printed substrate to the second wall surface of the second housing;
achieving an electrical connection between the printed substrate that is secured to the second wall surface of the second housing and the sensor portion that is joined to the top face of the second substrate;
joining the bottom face of the first pedestal to the top face of the sensor portion that is joined to the top face of the second pedestal;
securing a washer to the first wall surface of the first housing;
disposing a cylindrical spacer on the second wall surface of the second housing for which an electrical connection has been achieved between the printed substrate and the sensor portion;

coating the first adhesive agent onto the top face of the first pedestal, which is joined to the top face of the sensor portion;

combining the first housing, to which the washer is secured, and the second housing, whereon the cylindrical spacer is disposed and wherein the first adhesive agent is coated onto the top face of the first pedestal, and for positioning the top face of the first pedestal in a space surrounded by the inner peripheral surface of the washer;

fastening and securing the assembled first housing and second housing by a bolt through the cylindrical spacer; and curing the first adhesive agent in a state wherein the first housing and second housing are fastened and secured, to join the top face of the first pedestal, as the one face of the sensor chip, to the first wall surface of the first housing.

* * * * *